(12) United States Patent
Aines et al.

(10) Patent No.: US 8,834,605 B2
(45) Date of Patent: Sep. 16, 2014

(54) SEPARATION OF A TARGET SUBSTANCE FROM A FLUID OR MIXTURE USING ENCAPSULATED SORBENTS

(75) Inventors: Roger D. Aines, Livermore, CA (US); Christopher M. Spadaccini, Oakland, CA (US); Joshuah K. Stolaroff, Oakland, CA (US); William L. Bourcier, Livermore, CA (US); Jennifer A. Lewis, Urbana, IL (US); Eric B. Duoss, Dublin, CA (US); John J. Vericella, Champaign, IL (US)

(73) Assignees: Lawrence Livermore National Security, LLC., Livermore, CA (US); The Board of Trustees of the University of Illinois, Urbana, IL (US)

( * ) Notice: Subject to any disclaimer, the term of this patent is extended or adjusted under 35 U.S.C. 154(b) by 116 days.

(21) Appl. No.: 13/312,418

(22) Filed: Dec. 6, 2011

(65) Prior Publication Data

US 2012/0214219 A1    Aug. 23, 2012

Related U.S. Application Data

(60) Provisional application No. 61/444,461, filed on Feb. 18, 2011.

(51) Int. Cl.
B01D 53/14    (2006.01)
(52) U.S. Cl.
USPC ......... 95/92; 95/156; 95/183; 95/214; 95/236
(58) Field of Classification Search
USPC ............... 435/174, 183; 422/129; 502/100; 252/184; 423/230; 96/181; 95/156, 95/236; 977/902
See application file for complete search history.

(56) References Cited

U.S. PATENT DOCUMENTS

| | | | |
|---|---|---|---|
| 6,958,085 B1 * | 10/2005 | Parrish | 95/44 |
| 7,776,927 B2 | 8/2010 | Chu et al. | |
| 2007/0048848 A1 * | 3/2007 | Sears | 435/134 |
| 2007/0169625 A1 | 7/2007 | Aines et al. | |
| 2007/0170060 A1 | 7/2007 | Bourcier et al. | |
| 2009/0012187 A1 | 1/2009 | Chu et al. | |
| 2009/0131543 A1 | 5/2009 | Weitz et al. | |
| 2009/0199713 A1 * | 8/2009 | Asprion et al. | 95/236 |
| 2010/0300287 A1 | 12/2010 | Aines et al. | |
| 2010/0303694 A1 | 12/2010 | Aines et al. | |
| 2011/0269919 A1 * | 11/2011 | Min et al. | 525/540 |

FOREIGN PATENT DOCUMENTS

KR    20070014399 A  *  2/2007  ............. B01D 53/10
WO    WO 2009148959 A2 *  12/2009  ............... C02F 1/44

OTHER PUBLICATIONS

Machine Translation of KR 10-2005-0069008 (KR 20070014399).*
Engineering Toolbox—Solubility of Gases.*
Engineering Toolbox Date of Publication Verification on Google Search.*
Katie Walter, "Carbon Dioxide into the Briny Deep," Research Highlights, Lawrence Livermore National Laboratory, S&TR Dec. 2010, pp. 22-24.

* cited by examiner

*Primary Examiner* — Duane Smith
*Assistant Examiner* — Cabrena Holecek
(74) *Attorney, Agent, or Firm* — Eddie E. Scott

(57) ABSTRACT

Method and apparatus for separating a target substance from a fluid or mixture. Capsules having a coating and stripping solvents encapsulated in the capsules are provided. The coating is permeable to the target substance. The capsules having a coating and stripping solvents encapsulated in the capsules are exposed to the fluid or mixture. The target substance migrates through the coating and is taken up by the stripping solvents. The target substance is separated from the fluid or mixture by driving off the target substance from the capsules.

6 Claims, 9 Drawing Sheets

SEPARATION OF A TARGET SUBSTANCE FROM A FLUID OR MIXTURE USING ENCAPSULATED SORBENTS

CROSS-REFERENCE TO RELATED APPLICATIONS

The present application claims benefit under 35 U.S.C. §119(e) of U.S. Provisional Patent Application No. 61/444,461 filed Feb. 18, 2011 entitled "carbon dioxide separation using encapsulated sorbents." The disclosure of U.S. Provisional Patent Application No. 61/444,461 filed Feb. 18, 2011 is incorporated herein in its entirety for all purposes by this reference.

U.S. patent application Ser. No. 12/783,394 filed May 19, 2010 by Roger D. Aines, one of inventors in the present application, for Catalyst Functionalized Buffer Sorbent Pebbles for Rapid Separation of Carbon Dioxide from Gas Mixtures discloses systems related to the present invention. U.S. patent application Ser. No. 12/784,665 filed May 21, 2010 by Roger D. Aines, William L. Bourcier, and Brian Viani; Roger D. Aines and William L. Bourcier being inventors in the present application; for Slurried Solid Media for Simultaneous Water Purification and Carbon Dioxide Removal from Gas Mixtures discloses systems related to the present invention. The disclosures of U.S. patent application Ser. No. 12/783,394 filed May 19, 2010 and U.S. patent application Ser. No. 12/784,665 filed May 21, 2010 are incorporated herein in their entirety for all purposes by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to removal of substances from fluids or mixtures and more particularly to removal of a target substance from a fluid or mixture.

2. State of Technology

The article "carbon Dioxide into the Briny Deep" in the October 2010 issue of Science and Technology Review provides the state of technology information reproduced below.

WITH every passing year, the amount of carbon dioxide ($CO_2$) in the atmosphere increases. Because of the way this gas absorbs and emits infrared radiation, excessive quantities can cause the warming of Earth's atmosphere. Natural sources of atmospheric $CO_2$ such as volcanic outgassing, the combustion of organic matter, and the respiration processes of living aerobic organisms are nearly balanced by physical and biological processes that remove the gas from the atmosphere. For example, some $CO_2$ dissolves in seawater, and plants remove some by photosynthesis.

However, problems arise with the increased amounts of $CO_2$ from human activities, such as burning fossil fuels for heating, power generation, and transport as well as some industrial processes. Natural processes are too slow to remove these anthropogenic amounts from the atmosphere. In 2008, 8.67 gigatons of carbon (31.8 gigatons of $CO_2$) were released worldwide from burning fossil fuels, compared with 6.14 gigatons in 1990. The present level of atmospheric $CO_2$ is higher than at any time during the last 800,000 years and likely is higher than it has been in the last 20 million years. Researchers around the world are exploring ways to dispose of this excess. One proposed approach, called carbon capture and sequestration, is to store $CO_2$ by injecting it deep into the ocean or into rock formations far underground. The G8, an informal group of economic powers including the U.S., has endorsed efforts to demonstrate carbon capture and sequestration. The international forum recommended that work begin on at least 20 industrial-scale $CO_2$ sequestration projects, with the goal of broadly deploying the technology by 2020.

Several carbon sequestration projects are already under way. One, under the North Sea, is part of an oil drilling operation that separates $CO_2$ from natural gas and traps it in undersea rock formations. Other projects are using sequestered $CO_2$ to push oil around underground so that drillers can maximize the quantity of crude oil they remove—a process called enhanced oil recovery.

An alternative approach, being pursued by researchers at Lawrence Livermore and the Department of Energy's National Energy Technology Laboratory, involves putting $CO_2$ back into the ground while simultaneously producing freshwater. According to Livermore geochemist Roger Aines, who leads the Laboratory's work on this project, vast underground sandstone formations are filled with very salty water, many times saltier than the ocean. The idea is to pump $CO_2$ into these rock formations, thereby pushing briny water up into a reverse-osmosis water-treatment plant where most of the salt can be removed. The result is to increase volume for storing $CO_2$ in the underground formation while producing freshwater aboveground.

Although this water might be too salty to drink, it would provide a critical resource for industrial processes that require huge quantities of freshwater. Petroleum refining, for example, consumes 1 to 2 billion gallons of water per day. Even technologies designed to reduce greenhouse gases, such as the biofuels production process, are increasing demands on the world's water resources.

United States Published Patent Application No. 2007/0169625 by Roger D. Aines and William L. Bourcier for a carbon ion pump for removal of carbon dioxide from combustion gas and other gas mixtures provides the state of technology information described below.

Carbon dioxide makes up from 5% (modern gas-fired plants) to 19% (modern coal plants) of the flue gas from a power plant. The remainder is mostly nitrogen, unused oxygen, and oxides of nitrogen and sulfur (which are strong greenhouse gases in addition to contributing to poor quality). A major limitation to reducing greenhouse gases in the atmosphere is the expense of stripping carbon dioxide from other combustion gases. Without a cost-effective means of accomplishing this, the world's hydrocarbon resources, if used, will continue to contribute carbon dioxide to the atmosphere.

The disclosure of United States Published Patent Application No. 2007/0169625 is incorporated herein in its entirety for all purposes.

United States Published Patent Application No. 2007/0170060 by William L. Bourcier, Roger D. Aines, Jeffery, J. Haslam, Charlene, M. Schaldach, Kevin, C. O'Brien, and Edward Cussler for a deionization and desalination using electrostatic ion pumping provides the state of technology information described below.

The present invention provides for a method and system (e.g., a desalination system and method) that utilizes synchronized externally applied electrostatic fields in conjunction with an oscillating fluid flow to immobilize and separate ions from fluids. While salt ion removal from water is a preferred embodiment, it is to be understood that other ions can also be beneficially removed from fluids, as disclosed herein by the apparatus/systems and methods of the present invention. The ion pump separates any non-ionic liquid, from ionic impurities contained within that liquid. The present invention may therefore be used to purify either the liquid, as in the case of water, or the salts. One outlet stream has liquid reduced in salt content, and the other side it is increased and this side is useful if the valuable product is the salt, and not the fluid. In addition, many drugs are inherently ionic chemicals that can be separated by the methods disclosed herein from a liquid in which they have been created. As another beneficial embodiment, the methods and apparatus/system can be configured to separate valuable minerals, such as, but not limited to lithium. Conventionally, the separation of ions and impurities from electrolytes has been achieved using a variety of processes including: ion exchange, reverse osmosis, electro dialysis, electrodeposition, and filtering. In conventional reverse osmosis systems, for example, water is forced through a membrane, which acts as a filter for separating the ions and impurities from water. Reverse osmosis systems require significant energy to move the water through the membrane. The flux of water through the membrane results in a considerable pressure drop across the membrane. This pressure drop is responsible for most of the energy consumption by the process. The membrane also degrades with time, requiring the system to be shut down for costly and troublesome maintenance.

The disclosure of United States Published Patent Application No. 2007/0169625 is incorporated herein in its entirety for all purposes.

United States Published Patent Application No. 2010/0300287 by Roger D. Aines, William L. Bourcier, and Brian Viani for slurried solid media for simultaneous water purification and carbon dioxide removal from gas mixtures provides the state of technology information described below.

Most industrial process for separating $CO_2$ from gas mixtures utilize water as the primary separation media. This is because water provides an extremely large factor to separated carbon dioxide from non-ionizable nitrogen and oxygen. In those processes, the water contains additives that serve to buffer the carbonic acid that forms upon $CO_2$ dissolution, and also to speed the $CO_2$ dissolution process. Typically those additives are amines although in some processes hydroxides (such as NaOH) are used.

The disclosure of United States Published Patent Application No. 2010/0300287 is incorporated herein in its entirety for all purposes.

United States Published Patent Application No. 2010/0303694 by Roger D. Aines for catalyst functionalized buffer sorbent pebbles for rapid separation of $CO_2$ from gas mixtures provides the state of technology information described below.

Most industrial process for separating $CO_2$ from gas mixtures utilize water as the primary separation media. This is because water provides an extremely large factor to separated carbon dioxide from non-ionizable nitrogen and oxygen. In those processes, the water contains additives that serve to buffer the carbonic acid that forms upon $CO_2$ dissolution, and also to speed the $CO_2$ dissolution process. Typically those additives are amines although in some processes hydroxides (such as NaOH) are used.

The disclosure of United States Published Patent Application No. 2010/0300287 is incorporated herein in its entirety for all purposes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for the removal of a target substance from a fluid or mixture. Capsules having a coating and stripping material encapsulated in the capsules are provided. The coating is permeable to the target substance. The capsules having a coating and stripping material encapsulated in the capsules are exposed to the fluid or mixture. The target substance migrates through said coating and is taken up by the stripping material. The target substance is removed from the fluid or mixture by driving off the target substance from the capsules. The target material that has been removed can be sold, stored, sequestered, or otherwise disposed of.

The present invention has use in any application where a target substance needs to be removed from a fluid or mixture. For example, the present invention has use in the capture of carbon dioxide from gas mixtures containing carbon dioxide (examples: fossil fuel plants, natural gas streams, air). Also, the present invention has use in removing and/or capturing other gases including nitrous oxides (NOx), sulphates (SOx), hydrogen sulfide, or other trace gases that preferentially dissolve in a liquid for removal. In addition the present invention has use for producing products for the pharmaceutical, chemical, energy, food, coatings, cosmetic, and other industries.

In one embodiment, the present invention provides an apparatus and method for separating carbon dioxide from a gas mixture that includes carbon dioxide. Capsules having a polymer coating and stripping solvents encapsulated in the capsules are provided. The polymer coating is permeable to carbon dioxide. The polymer coated capsules are exposed to the gas mixture that includes carbon dioxide. The carbon dioxide migrates through the polymer coating of the capsules and is taken up by the stripping solvents. The carbon dioxide is separated from the gas mixture by driving off the carbon dioxide from the polymer coated capsules. This may be accomplished by heating the polymer coated capsules. For example, steam can be directed onto the polymer coated capsules to drive off the carbon dioxide from the capsules. The carbon dioxide that has been separated from the gas mixture can be sold, stored, sequestered, or otherwise disposed of.

Many industrial carbon dioxide separation schemes utilize water as the primary separation media, with additives such as amine compounds to increase the rate or capacity. This is because water provides an extremely large factor to separate carbon dioxide from non-ionizable nitrogen and oxygen. Once the $CO_2$ dissolves in water, it is now a very different molecule than oxygen and nitrogen, with concordant high separation efficiency.

The present invention provides a system for water based removal of carbon dioxide by encapsulating $CO_2$ stripping solvents in polymers. The capsules that are produced contain solvent or solvent mixtures that can be freely tailored to the feed stream to optimize $CO_2$ loading, minimize the heat for regeneration, lower the heat of mixing, and limit the flux of corrosive by-products into a stripping tower. Sorbents may be mixtures of amines, or inorganic bases and carbonates, ammonia, ionic liquids, or alkaline solid-liquid slurries. The present invention optionally incorporates enzymes or catalysts to enhance the rate of $CO_2$ hydration and increase the rate of uptake. The present invention enables better heat cycle performance and reduces solvent loss during processing when compared to conventional amine stripping technologies.

The present invention provides a system for separating carbon dioxide from a gas mixture. The gas mixture and the carbon dioxide are dissolved in water providing water with the dissolved gas and carbon dioxide. Capsules having a polymer coating and stripping solvents encapsulated in the capsules are produced for separating the carbon dioxide. The capsules containing the stripping solvents are exposed to the gas and carbon dioxide. The carbon dioxide migrates through the polymer coating and is taken up by the stripping solvents. The carbon dioxide is separated by driving off the carbon dioxide from the capsules using heat, chemical exchange, or other chemical processes.

The present invention provides the effective use of catalysts to open up a new range of process conditions and methods for industrial $CO_2$ capture, ranging from near-term improvement of existing processes, to longer term enablement of a new process where the working solvent is encapsulated in a polymer coat, minimizing corrosion and solvent degradation problems while greatly reducing the total energy requirement by reducing the water content of the solvent.

The encapsulation of amines within a spherical polymer shell in accordance with the present invention has advantages over conventional amine capture systems. First, isolating the amines within the polymer shell can reduce degradation of the solvent and confine any degradation products to the capsule, thereby reducing corrosion of the capture system. This allows for higher concentrations of solvent and thus higher loadings of $CO_2$, reducing the energy needed for regeneration, and permits batches of solvent to have a longer lifetime before they must be removed due to degradation product buildup. Second, encapsulation allows novel process designs. For example, a capture system based on encapsulated amines may look like a fluidized bed as opposed to a conventional packed tower. The beads can be agitated either by the flue gas or stripping gas, and run as a batch process. Third, encapsulation enforces a high surface area per volume of solvent, improving the performance particularly of viscous stripping solvents which may be hard to use in conventional applications. This new process concept takes advantage of the encapsulation during the regeneration step by all the same advantages previously cited, and also by permitting a stripping using heat transfer media that have a lower boiling point and heat of vaporization than water (e.g. methanol) or a lower water pressure such as hot oil. Such alternative methods cannot be used with exposed amine solution, but in an encapsulated system they would enable higher or lower-temperature regeneration, reducing the capital cost and energy requirements of operating the stripper under vacuum or permitting recovery of carbon dioxide at very high pressure, reducing the subsequent cost of compression required for storage or transport.

The present invention provides benefits in fabrication and manufacturability. The beads can be fabricated at a size small enough for efficient mass transfer and large enough for ease of handling. The present invention provides methods to fabricate liquid filled shells in the size range of 100 microns to 1 mm with wall thickness from 5-10 microns.

The present invention provides benefits in survivability and robustness. The present invention identifies several polymers that can withstand typical regeneration temperatures of 100-150 C. In addition, the selected polymers will be capable of withstanding small volumetric changes due to absorption desorption of $CO_2$ and water. Applicants have determined from data on the densities of common $CO_2$ solvents that loading and unloading cycles will not cause a volume increase such that the capsule is likely to burst.

Applicants have also determined that mass transport of other constituents in the gas and sorbent will not significantly interfere with $CO_2$ capture. Water will tend to diffuse through the capsule wall depending on concentration and pressure gradients and their directions. The vapor pressure of water outside the capsule during loading will be that of the flue gas, which varies with fuel and process type, but is generally around 10% by volume. The water vapor pressure surrounding the capsule is therefore expected to be around 0.1 bars. The partial pressure (fugacity) of water inside the capsule will depend on the relative proportions of water, amine and $CO_2$, but is typically also around 0.1 bars. No significant mass transport of water into or out of the capsule is anticipated in an amine-water system. A feature of system is that the water in the capture solvent can be adjusted to be equal to the partial pressure of water for a given flue gas to be used as a $CO_2$ source. Water transfer into other solvents (carbonates, ionic liquids) can be accommodated by slight changes in size of the polymer. The polymers under consideration are sufficiently elastic to permit changes in size of +/-10% typically.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 2:
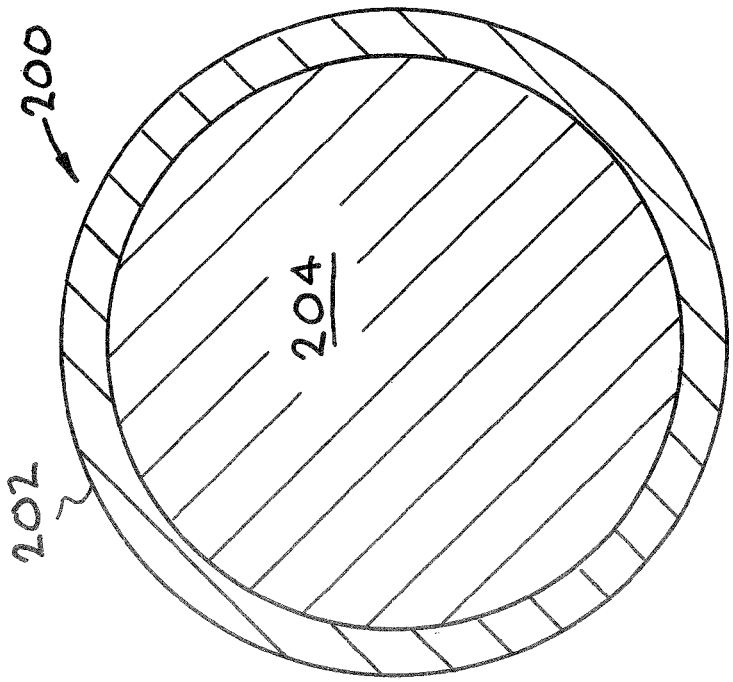
FIG. 2 illustrates an embodiment of one of the capsules shown in FIG. 1.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a system for the removal of a target substance from a fluid or mixture. The system has use in any application where a target substance needs to be removed from a fluid or mixture. For example, has use in processing system for producing products for the pharmaceutical, chemical, energy, food, coatings, cosmetic, and other industries. Also, the system has use in the capture of carbon dioxide from gas mixtures containing carbon dioxide (examples: fossil fuel plants, natural gas streams, air). The system has use in removing and/or capturing other gases including nitrous oxides (NOx), sulphates (SOx), hydrogen sulfide, or other trace gases that preferentially dissolve in a liquid for removal. In the system of the present invention, capsules having a coating and stripping material encapsulated in the capsules are provided. The coating is permeable to the target substance. The capsules having a coating and stripping material encapsulated in the capsules are exposed to the fluid or mixture. The target substance migrates through said coating and is taken up by the stripping material. The target substance is removed from the fluid or mixture by driving off the target substance from the capsules. The target material that has been removed can be sold, stored, sequestered, or otherwise disposed of.

The present invention provides an apparatus and method for separating carbon dioxide from a gas mixture including carbon dioxide. Capsules having a polymer coating and stripping solvents encapsulated in the capsules are provided. The polymer coating is permeable to carbon dioxide. The polymer coated capsules are exposed to the gas mixture that includes carbon dioxide. The carbon dioxide migrates through the polymer coating of the capsules and is taken up by the stripping solvents. The carbon dioxide is separated from the gas mixture by driving off the carbon dioxide from the polymer coated capsules. This may be accomplished, for instance, by heating the polymer coated capsules. For example, steam can be directed onto the polymer coated capsules to drive off the carbon dioxide from the capsules. The carbon dioxide that has been separated from the gas mixture can be sold, stored, sequestered, or otherwise disposed of.

Many industrial carbon dioxide separation schemes utilize water as the primary separation media, with additives such as amine compounds to increase the rate or capacity. This is because water provides an extremely large factor to separate carbon dioxide from non-ionizable nitrogen and oxygen. Buffer compounds are fundamentally required to keep the water solution in the correct pH region for the conversion of $CO_2$ to carbonate or bicarbonate ions.

The present invention provides a system for removal and concentration of carbon dioxide by encapsulating $CO_2$ stripping solvents in polymers. The capsules that are produced contain solvent or solvent mixtures that can be freely tailored to the feed stream to optimize $CO_2$ loading, minimize the heat for regeneration, lower the heat of mixing, and limit the flux of corrosive by-products into a stripping tower. Sorbents may be mixtures of amines, or inorganic bases, or alkaline solid-liquid slurries. The present invention optionally incorporates enzymes or catalysts to enhance the rate of $CO_2$ hydration and increase the rate of uptake. The present invention enables better heat cycle performance and reduces solvent loss during processing when compared to conventional amine stripping technologies.

Figure 1:
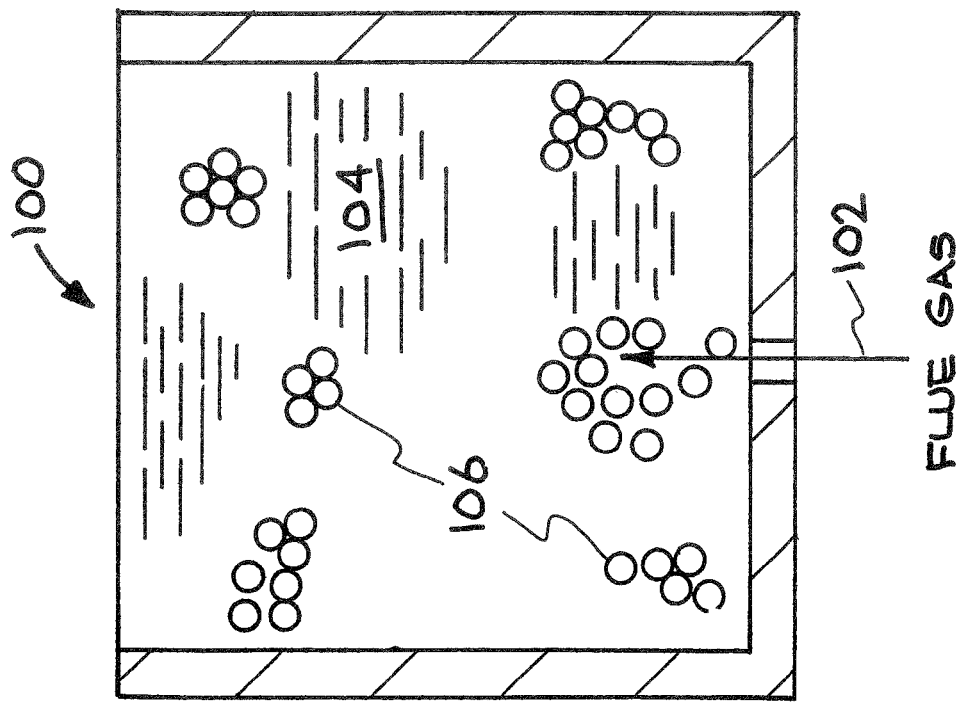
FIG. 1 is a pictorial illustration of a system for separating carbon dioxide from gas mixtures.

Referring now to the drawings and in particular to FIG. 1, an embodiment of a system for separating carbon dioxide from gas mixtures is illustrated. The system for separating carbon dioxide from gas mixtures is designated generally by the reference numeral 100. As illustrated in FIG. 1 a flue gas 102 is bubbled through a slurry of water 104 and capsules 106. Water is optional in the process but is always present in flue gas, even if not in liquid form.

The capsules include a polymer coating and stripping solvents encapsulated within the capsules 106. The polymer surface layer is permeable to carbon dioxide. The stripping solvents encapsulated within the capsule can be any or a mixture of the following: primary, secondary, tertiary, and hindered amines, caustic solutions, ionic buffer solutions, ionic liquids, ammonia, and other solvents having high a solubility of carbon dioxide.

Carbon dioxide is absorbed by passing the flue gas 102 from which the carbon dioxide is to be separated through the slurry made up of water 104 and the capsules 106. The carbon dioxide migrates through the polymer coating of the capsules 106 and is taken up by the stripping solvents. The carbon dioxide is separated by driving off the carbon dioxide from the capsules. The carbon dioxide can be transported to an injection site for sequestration and long-term storage in any of a variety of suitable geologic formations.

Referring now to FIG. 2, an embodiment of one of the capsules shown in FIG. 1 is illustrated in greater detail. The capsule is designated generally by the reference numeral 200. The capsule 200 includes a polymer coating 202 and stripping solvents 204 encapsulated within the capsule 200. The capsule 200 is 200 to 500 microns in diameter.

The polymer surface layer 202 is optimally less than 10 microns thick and is very permeable to carbon dioxide. The polymer surface layer 202 is made of any of several families of polymers, including polystyrene, polyethylene, polypropylene, nylon, and others.

The stripping solvents 204 encapsulated within the capsule 200 can be any or a mixture of the following: primary, secondary, tertiary, and hindered amines, caustic solutions, ionic buffer solutions, ammonia, ionic liquids, and other solvents having high a solubility of carbon dioxide.

The capsules are used to capture carbon dioxide from gas mixtures. The contacting device can be one of several configurations including a fluidized bed, a countercurrent flow, suspended in an aqueous liquid, etc. After loading, the capsules are typically regenerated thermally in a controlled environment where the carbon dioxide is released in pure form suitable for compression and injection into the subsurface. The environment could be that of steam at a partial pressure such that is it in equilibrium with water inside the capsules to prevent water transport into or out of the capsule. Dry heat from an heat exchanger or oil bath could optionally be used at this stage.

The present invention provides the effective use of catalysts to open up a new range of process conditions and methods for industrial $CO_2$ capture, ranging from near-term improvement of existing processes, to longer term enablement of a new process where the working solvent is encapsulated in a polymer coat, minimizing corrosion and solvent degradation problems while greatly reducing the total energy requirement by reducing the water content of the solvent.

The encapsulation of amines within a spherical polymer shell in accordance with the present invention has advantages over conventional amine capture systems. First, isolating the amines within the polymer shell can limit degradation of the solvent and prevent migration of any degradation products formed, thereby reducing corrosion of the capture system. This allows for higher concentrations of solvent and thus higher loadings of $CO_2$, reducing the energy needed for regeneration. Equipment may be smaller and constructed out of less expensive materials, for instance carbon steel in place of stainless steel, when the corrosion products are contained within the capsules and unable to react with the capture device. Second, encapsulation allows novel process designs. For example, a capture system based on encapsulated amines may look like a fluidized bed as opposed to a conventional packed tower. The beads can be agitated either by the flue gas (or stripping gas) or run as a batch process. This new process concept can take advantage of the encapsulation during regeneration by using a stripping that has a lower boiling point and heat of vaporization than water (e.g. methanol). Such alternative gases cannot be used with exposed amine solution, but in an encapsulated system they would enable lower-temperature regeneration without the capital cost and energy requirements of operating the stripper under vacuum.

The present invention provides benefits in fabrication and manufacturability. The beads can be fabricated at a size small enough for efficient mass transfer and large enough for ease of handling. The present invention provides methods to fabricate liquid filled shells in the size range of 100 microns to 1 mm with wall thickness from 5-10 microns.

The present invention provides benefits in survivability and robustness. The present invention identifies several polymers that can withstand typical regeneration temperatures of 100-120 C. In addition, the selected polymers will be capable of withstanding small volumetric changes due to absorption desorption of $CO_2$ and water. Applicants have determined from data on the densities of common $CO_2$ solvents that loading and unloading cycles will not cause a volume increase such that the capsule is likely to burst.

The capsule 200 shown in FIG. 2 can be used to illustrate other embodiments of the present invention. The capsule 200 is illustrative of a system utilizing capsules having a coating 202 and stripping material 204 encapsulated in the capsules that capture a target substance in a fluid or mixture. The coating 202 is permeable to the target substance and the target substance migrates through said coating 202 and is taken up by the stripping material 204. The target substance is capture by driving off the target substance from the capsule 200 thereby separating the target substance from the fluid or mixture.

In one embodiment the coating 202 is made of a porous solid. In another embodiment the coating 202 includes carbon fibers. In yet another embodiment the coating 202 includes carbon nanotubes. The carbon nonotubes can be used to provide strength and resilience to the capsule 200. The carbon nonotubes can aligned to improve and control permeability of the coating 202. In another embodiment the coating 202 is made of any of several families of polymers, including polystyrene, polyethylene, polypropylene, and nylon. The surface layer 202 is optimally less than 10 microns thick and is very permeable to the target substance.

In one embodiment the stripping solvents 204 encapsulated within the capsule 200 can be primary, secondary, tertiary, and hindered amines, caustic solutions, ionic buffer solutions, ammonia, or other solvents having solubility of carbon dioxide encapsulated in the capsules. In another embodiment the stripping solvents 204 encapsulated within the capsule 200 can be nitrous oxide wherein the nitrous oxide migrates through the coating 202 and is taken up by the stripping material 204. In yet another embodiment the stripping solvents 204 encapsulated within the capsule 200 can be sulphates wherein the sulphates migrate through the coating 202 and are taken up by the stripping material 204. In another embodiment the stripping solvents 204 encapsulated within the capsule 200 can be hydrogen sulfide wherein the hydrogen sulfide migrates through the coating 202 and is taken up by the stripping material 204.

The present invention is further explained by a number of examples. The examples further illustrate Applicants' system for separating carbon dioxide from a gas mixture. In the examples, the gas mixture and the carbon dioxide are dissolved in water providing water with the dissolved gas and carbon dioxide. The capsules have a polymer coating and stripping solvents encapsulated within the capsules. The capsules containing the stripping solvents are exposed to the water with the dissolved gas and carbon dioxide. The carbon dioxide migrates through the polymer coating and is taken up by the stripping solvents. The carbon dioxide is separated by driving off the carbon dioxide from the capsules.

EXAMPLE 1

Figure 3:
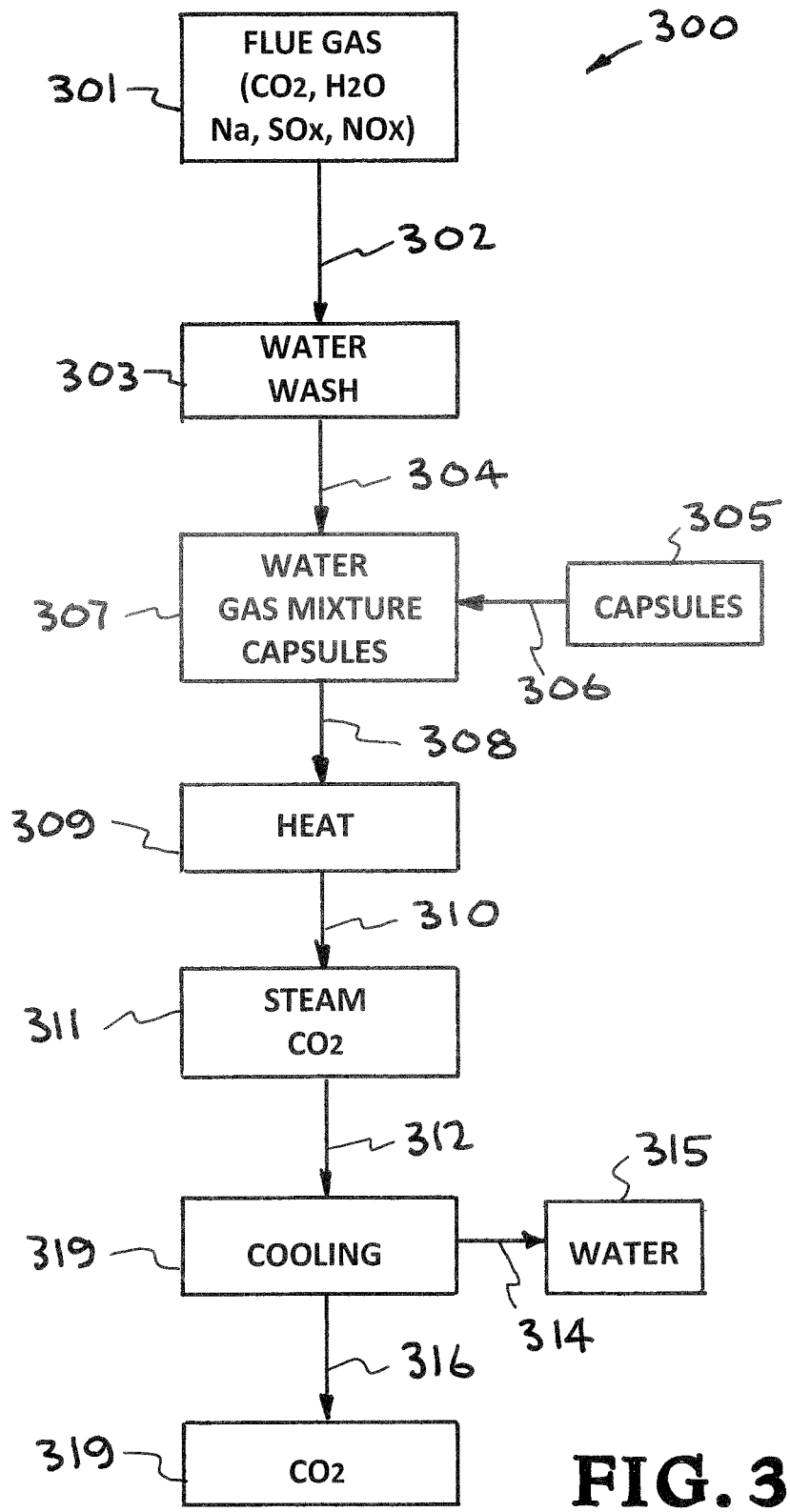
FIG. 3 illustrates another embodiment of a system for separating carbon dioxide from gas mixtures.

In example 1, a system for carbon dioxide removal from gas mixtures is described and illustrated. Example 1 is illustrated by FIG. 3 showing a method of separating $CO_2$. The method is designated generally by the reference numeral 300. The steps of the method 300 are described below.

Method Steps—FIG. 3

Step 1 (Reference Numeral 302)—Flue gas (e.g., $CO_2$, $H_2O$, $N_2SO_x$, $NO_x$) and/or other gas mixtures 301 is processed in a water wash 303. The system/process 300 is thus designed to dissolve flue gas and/or other gas mixtures first in slightly alkaline water as introduced by the water wash 303 prior to producing a concentrate from which a harvested $CO_2$ can be produced. The water wash 303 system itself can be incorporated from known systems utilized by those of ordinary skill in the art. As an illustration only, the common system can include a plurality of spray levels to inject the liquid so as to contact the flue gas, which is designed to flow through such a water wash 303 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 304)—The water containing the flue gas passes from water wash 303 to an area wherein capsules 305 are added forming a slurry 307 of water, capsules 305, $CO_2$, and the impurities. Carbon dioxide is absorbed by passing the gas from which the carbon dioxide is to be separated through the slurry 307 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the capsules 305. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the capsules 305, permitting more to dissolve into the water until saturation is reached.

Step 3 (Reference Numerals 308, 309, 310, & 311)—The mixture of capsules containing the $CO_2$ is then heated 309 to the boiling point of water (typically 100.degree. C.) to release the $CO_2$ from the capsules 305. During the heating 309 step steam 311 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 312 & 313)—The steam 311 is condensed by cooling 313.

Step 5 (Reference Numerals 314 & 315)—Condensing of the steam 311 produces fresh water 315. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 316 & 319)—Condensing of the steam 311 purifies the gas stream coming out of the process to nearly pure $CO_2$ 319. The $CO_2$ 319 can be used or sequestered. The $CO_2$ 319 can be transported to an injection site for sequestration and long-term storage in any of a variety of suitable geologic formations.

EXAMPLE 2

In example 2, a system for simultaneous water purification and carbon dioxide removal from gas mixtures is described and illustrated. Example 2 is illustrated by the method illustrated in FIG. 4. The method is designated generally by the reference numeral 400. The steps of the method 400 are described below.

Figure 4:
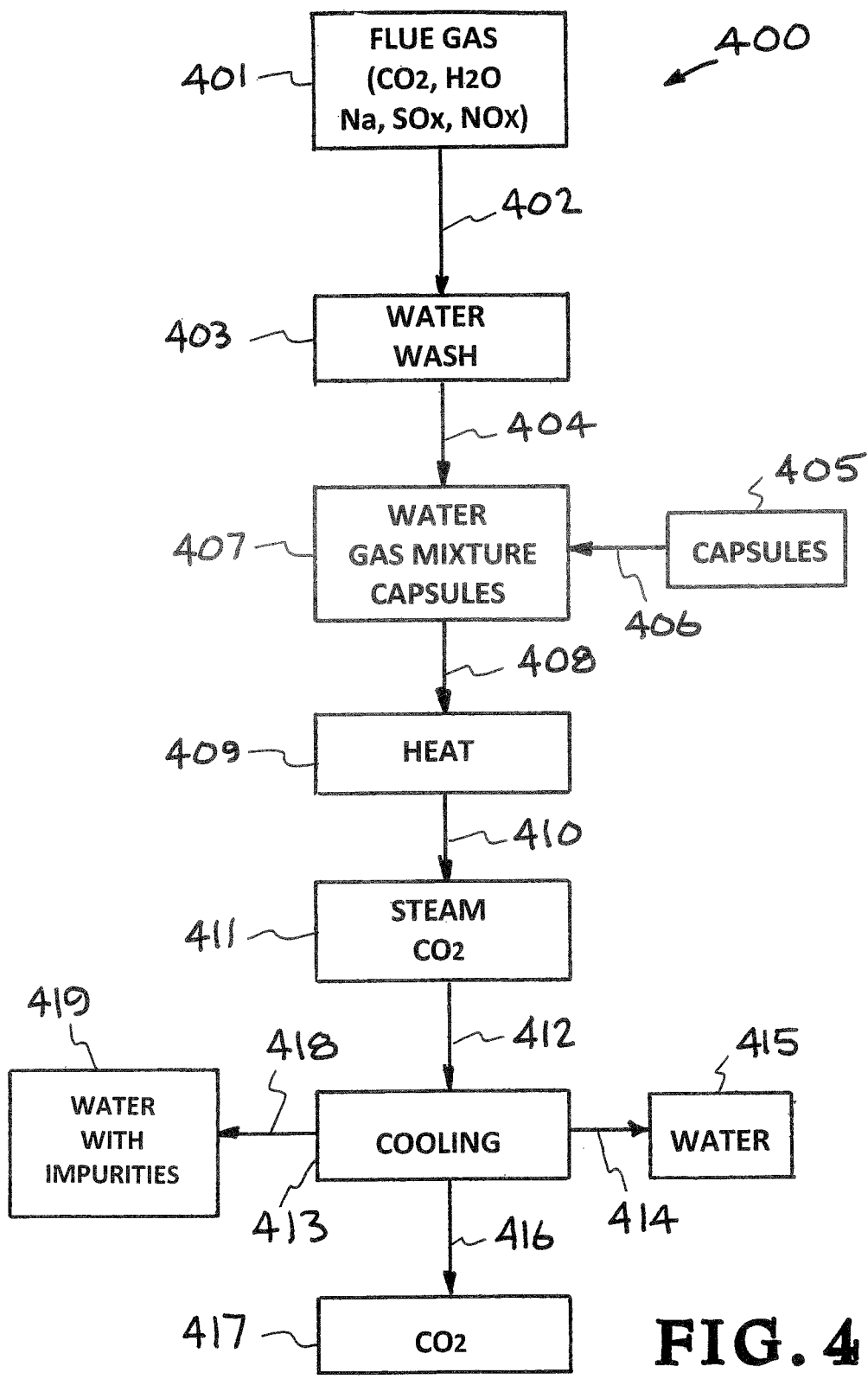
FIG. 4 illustrates yet another embodiment of a system for separating carbon dioxide from gas mixtures.

Method Steps—FIG. 4

Step 1 (Reference Numeral 402)—Flue gas (e.g., $CO_2$, $H_2O$, $N_2SO_x$, $NO_x$) and/or other gas mixtures 401 is processed in a water wash 403. The system/process 400 is thus designed to dissolve flue gas and/or other gas mixtures first in slightly alkaline water as introduced by the water wash 403 prior to producing a concentrate from which a harvested $CO_2$ can be produced. The water wash 403 system itself can be incorporated from known systems utilized by those of ordinary skill in the art. As an illustration only, the common system can include a plurality of spray levels to inject the liquid so as to contact the flue gas, which is designed to flow through such a water wash 403 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 404)—The water containing the flue gas passes from water wash 403 to an area wherein capsules 405 are added forming a slurry 407 of water, capsules 405, $CO_2$, and the impurities. Carbon dioxide is absorbed by passing the gas from which the carbon dioxide is to be separated through the slurry 407 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the capsules 405. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the capsules 405, permitting more to dissolve into the water until saturation is reached.

Step 3 (Reference Numerals 408, 409, 410, & 411)—The mixture of capsules containing the $CO_2$ is then heated 409 to the boiling point of water (typically 100.degree. C.) to release the $CO_2$ from the capsules 405. During the heating 409 step steam 411 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 412 & 413)—The steam 411 is condensed by cooling 413.

Step 5 (Reference Numerals 414 & 415)—Condensing of the steam 411 produces fresh water 415. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 416 & 417)—Condensing of the steam 411 purifies the gas stream coming out of the process to nearly pure $CO_2$ 417. The $CO_2$ 417 can be used or sequestered. The $CO_2$ 417 can be transported to an injection site for sequestration and long-term storage in any of a variety of suitable geologic formations.

Step 7 (Reference Numerals 416 & 417)—Condensing of the steam 411 with removal of the $CO_2$ 417 and water 415 leaves water with impurities 419.

EXAMPLE 3

In example 3, a system for simultaneous water purification and carbon dioxide removal from gas mixtures is described and illustrated. Example 3 is illustrated by the method illustrated in FIG. 5. The method is designated generally by the reference numeral 500. The steps of the method 500 are described below.

Figure 5:
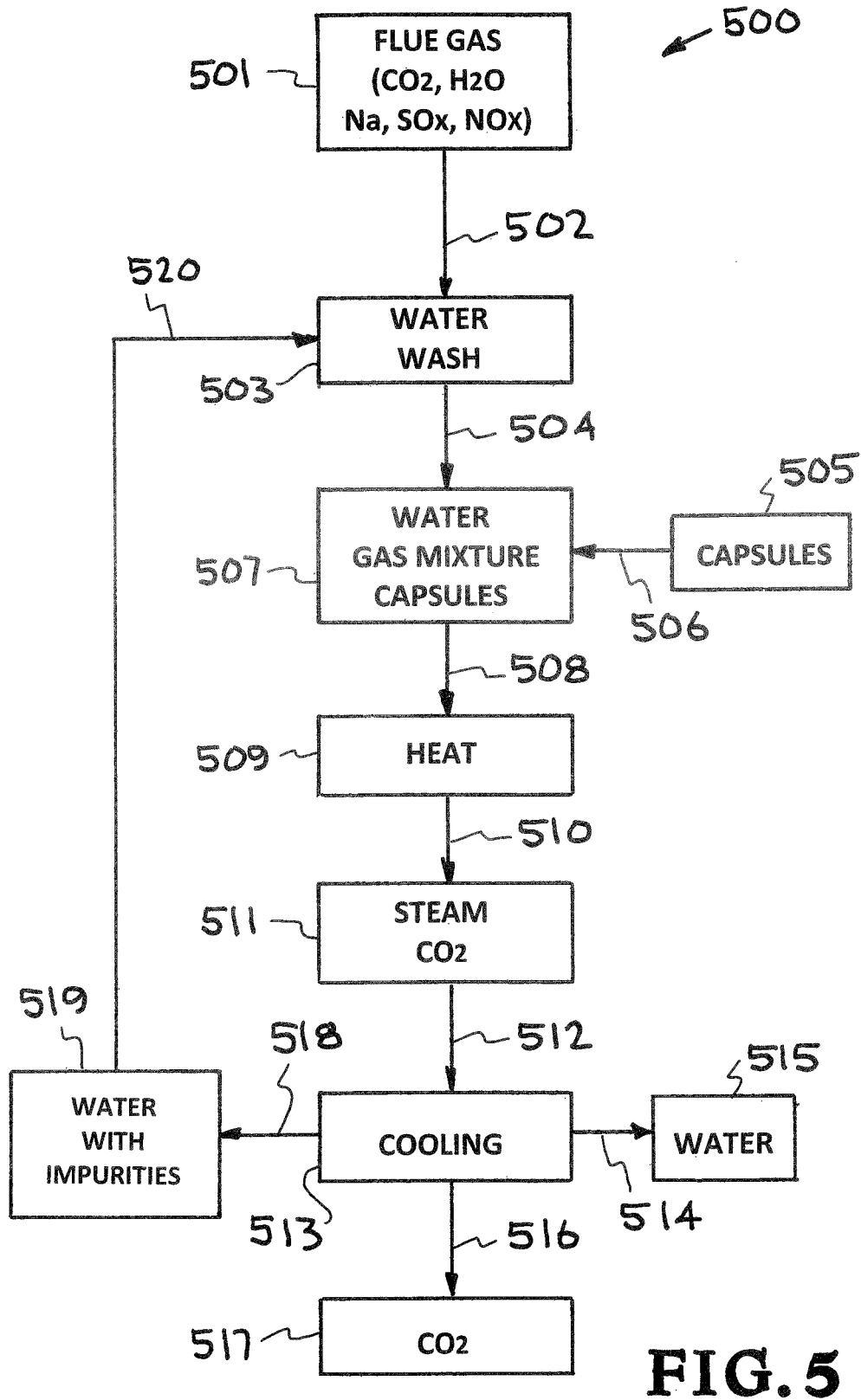
FIG. 5 illustrates yet another embodiment of a system for separating carbon dioxide from gas mixtures.

Method Steps—FIG. 5

Step 1 (Reference Numeral 502)—Flue gas (e.g., $CO_2$, $H_2O$, $N_2SO_x$, $NO_x$) and/or other gas mixtures 501 is processed in a water wash 503. The system/process 500 is thus designed to dissolve flue gas and/or other gas mixtures first in slightly alkaline water as introduced by the water wash 503 prior to producing a concentrate from which a harvested $CO_2$ can be produced. The water wash 503 system itself can be incorporated from known systems utilized by those of ordinary skill in the art. As an illustration only, the common system can include a plurality of spray levels to inject the liquid so as to contact the flue gas, which is designed to flow through such a water wash 503 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 504)—The water containing the flue gas passes from water wash 503 to an area wherein capsules 505 are added forming a slurry 507 of water, capsules 505, $CO_2$, and the impurities. Carbon dioxide is absorbed by passing the gas from which the carbon dioxide is to be separated through the slurry 507 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the capsules 505. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the capsules 505, permitting more to dissolve into the water until saturation is reached.

Step 3 (Reference Numerals 508, 509, 510, & 511)—The mixture of capsules containing the CO, is then heated 509 to the boiling point of water (typically 100.degree. C.) to release the $CO_2$ from the capsules 505. During the heating 509 step steam 511 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 512 & 513)—The steam 511 is condensed by cooling 513.

Step 5 (Reference Numerals 514 & 515)—Condensing of the steam 511 produces fresh water 515. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 518 & 519)—Condensing of the steam 511 purifies the gas stream coming out of the process to nearly pure $CO_2$ 517. The $CO_2$ 517 can be used or sequestered. The $CO_2$ 517 can be transported to an injection site for sequestration and long-term storage in any of a variety of suitable geologic formations.

Step 7 (Reference Numerals 516 & 517)—Condensing of the steam 511 with removal of the $CO_2$ 517 and water 515 leaves water with impurities 519.

Step 8 (Reference Numeral 520)—The water with impurities 519 is transferred to the water wash 103 as illustrated by the arrow 520.

EXAMPLE 4

Figure 6A:
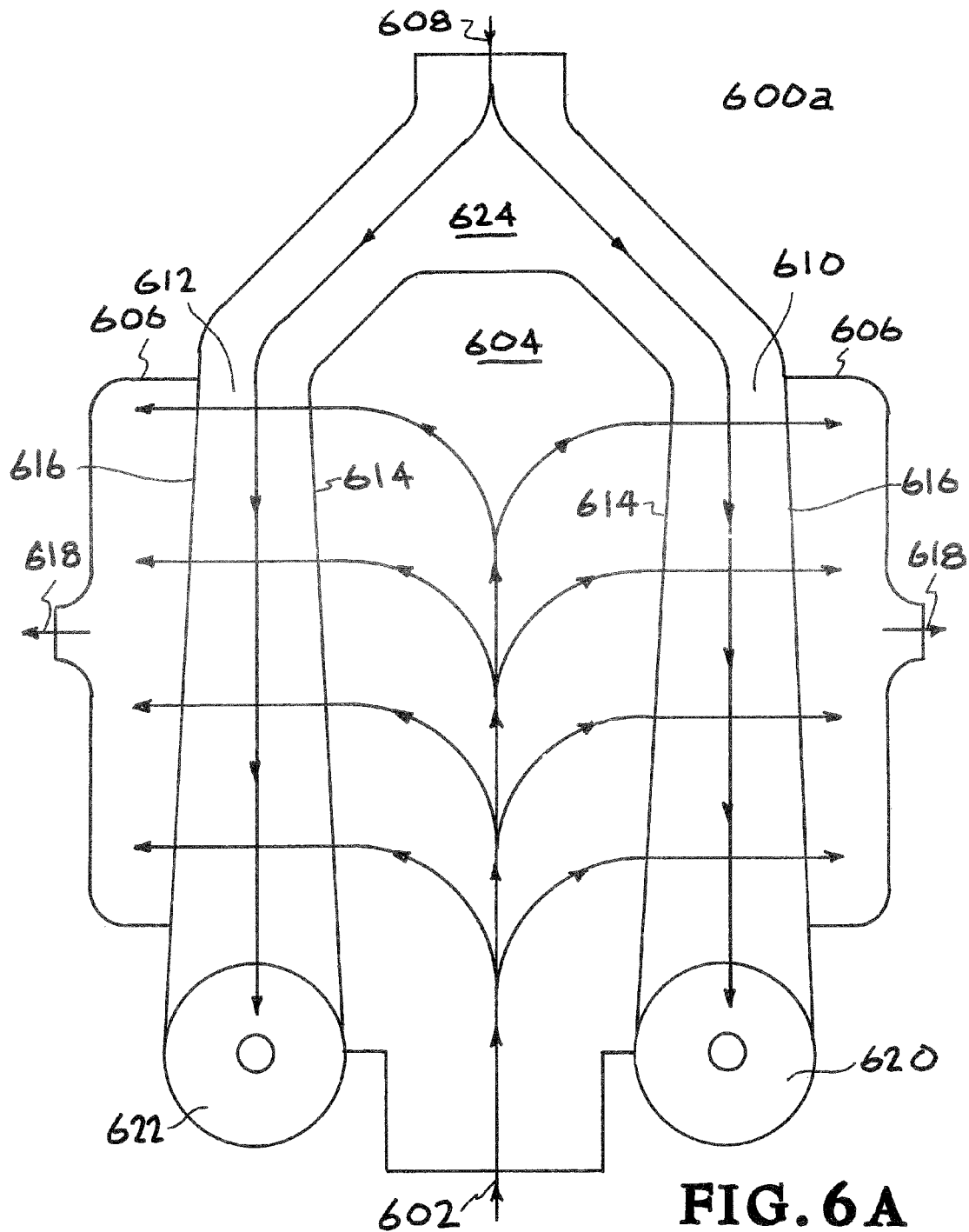
FIGS. 6A and 6B illustrate another embodiment of a system for separating carbon dioxide from gas mixtures.
Figure 6B:
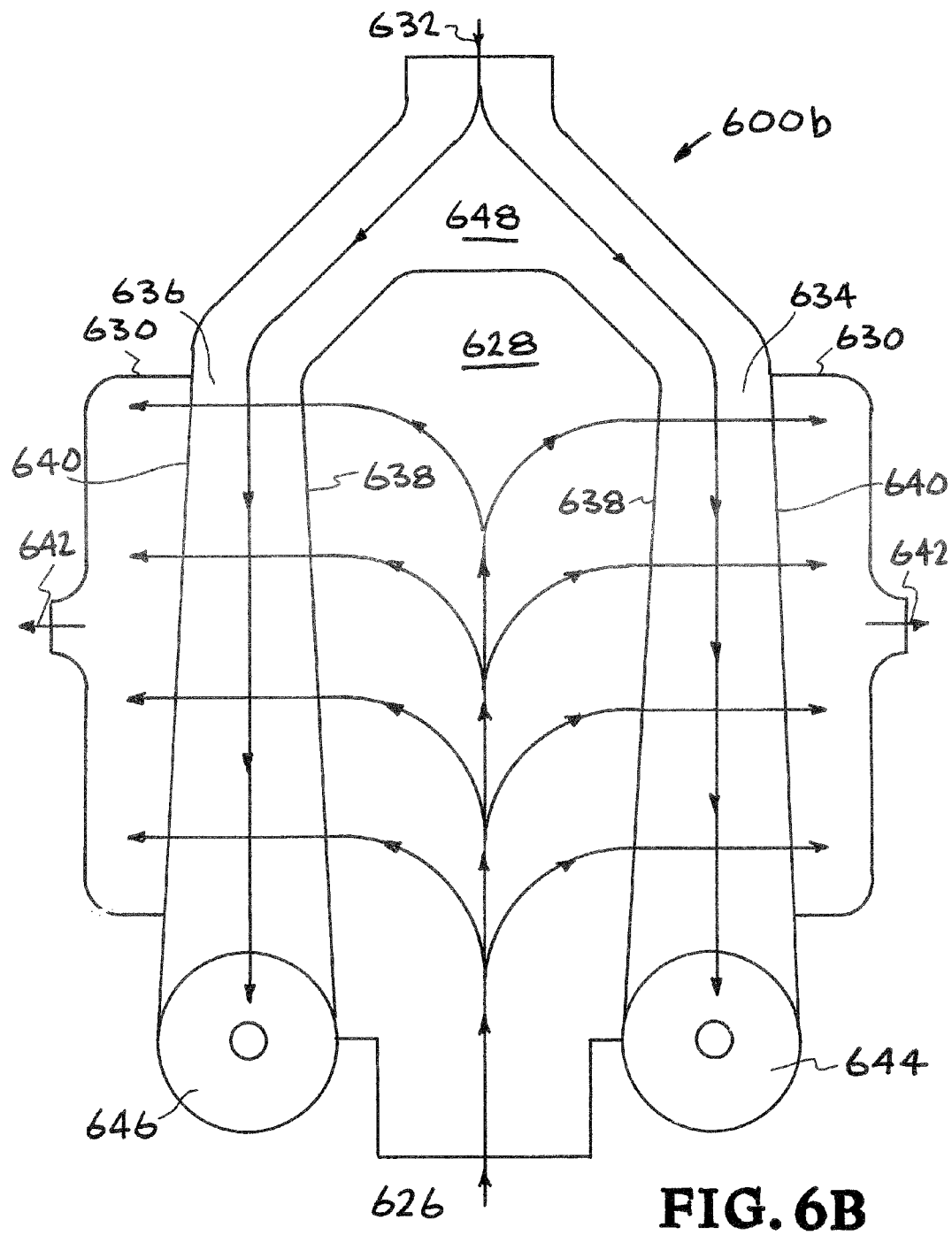

In example 4, another system for separating carbon dioxide from gas mixtures including carbon dioxide is illustrated. Example 4 is illustrated in FIGS. 6A and 6B. FIG. 6A illustrates a microcapsule $CO_2$ machine for separating carbon dioxide from a gas mixture that includes carbon dioxide. This machine is designated generally by the reference numeral 600a. The microcapsule $CO_2$ machine 600a is composed of the following items. There is an incoming gas stream 602 that contains $CO_2$. There are both an inner plenum 604 and two outer plenums 606. The microcapsule stream 608 enters the diverter 624 and proceeds to the first microcapsule chamber 610 and second microcapsule chamber 612. Both of these chambers have an inner wall 614 and an outer wall 616. The outer plenums have exits 618. At the bottom of the chambers 610 and 612 are located screw conveyors 620 and 622.

In operation a stream of microcapsules (previously described in this application) enters the diverter 624 where the capsules are directed into the two chambers 610 and 612. The capsules in these two chambers form a bed of $CO_2$ capturing capsules. The incoming gas stream 602 (flue gas) that contains the $CO_2$ the is to be captured by the microcapsules enters the inner plenum 604 where the gas passes through inner wall 614 through multiple openings that are sized to prevent the passage of the microcapsules. The gas stream then flows through the bed of capsules where the $CO_2$ is captured by the capsules. The gas steam then exits the capsule bed thru outer wall 616 that also has openings sized to prevent the passage of the microcapsules. The gas stream now stripped of the $CO_2$ now enters the outer plenums 606 where it is collected. The steam exits the plenums at 618 for release to the atmosphere or for further processing.

The capsules bed descends in the two chambers 610 and 612 at some rate determined by the capture of the $CO_2$ (saturation). The screw conveyors then transport the $CO_2$ saturated microcapsules to the next machine the microcapsule regeneration machine 600b which will be illustrated and described in FIG. 6B FIG. 6B shows the microcapsule regeneration machine 600b. This machine is made up of many of the same items as the previous machine so we will not list all those items but proceed to the operation of the machine. The gas stream 626 will be steam and enters the inner plenum 628. From the plenum the steam passes thru the inner wall 638 that has multiple openings again sized to prevent the passage of the microcapsules. The steam flows thru the bed of this time $CO_2$ saturated capsules and the action of the steam will liberated the $CO_2$ from the capsules. The steam and the liberated $CO_2$ then exits the capsule bed thru the outer wall 640 and be collected in the outer plenums 630. The steam and $CO_2$ exits the plenums 630 at openings 642 for further processing.

Figure 8:
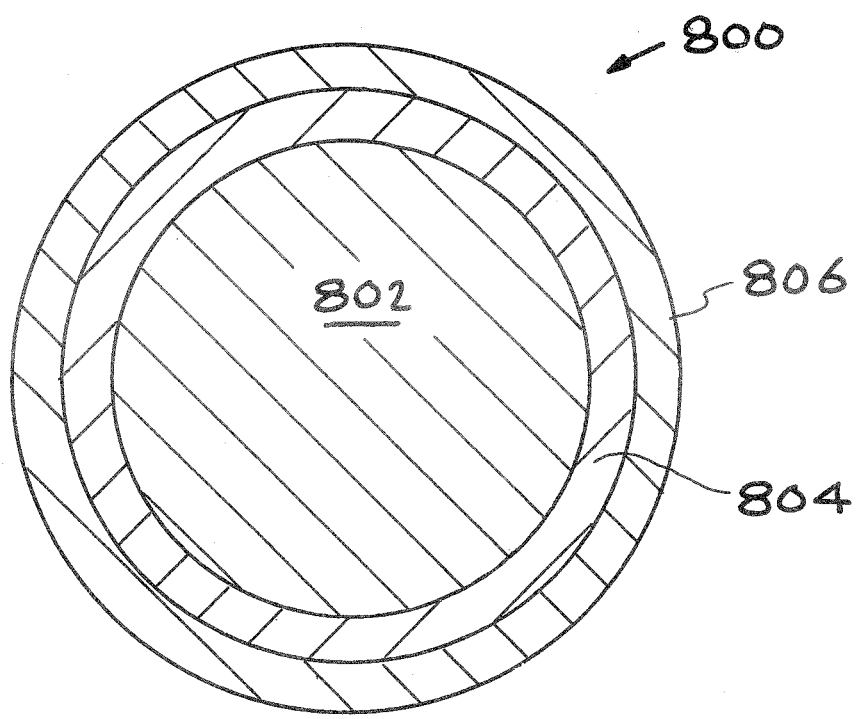
FIG. 8 illustrates use of catalysts and polymer additives to improve capsule performance.

Various additions may be made to the basic system in order to enhance functionality. FIG. 8 shows a cross section of a microcapsule. In FIG. 8, 801 is a layer of catalyst or enzyme added to enhance the reaction rate of carbon dioxide to dissolved carbonate. This may be either dissolved in the polymer, the solvent, or as a separate layer (a triple emulsion) during bead creation. In FIG. 8, 802 shows the addition of fibers, nanotubes, or other permeability-enhancing components that improve the permeability of the capsule, or its strength or abrasion resistance. These could include carbon nanotubes, silicon carbide, nylon, or a variety of other materials that enhance the basic function of the polymer shell. In the case of 803 the fibers are oriented along the shell radius for purposes of strength improvement or abrasion resistance.

EXAMPLE 5

Figure 9:
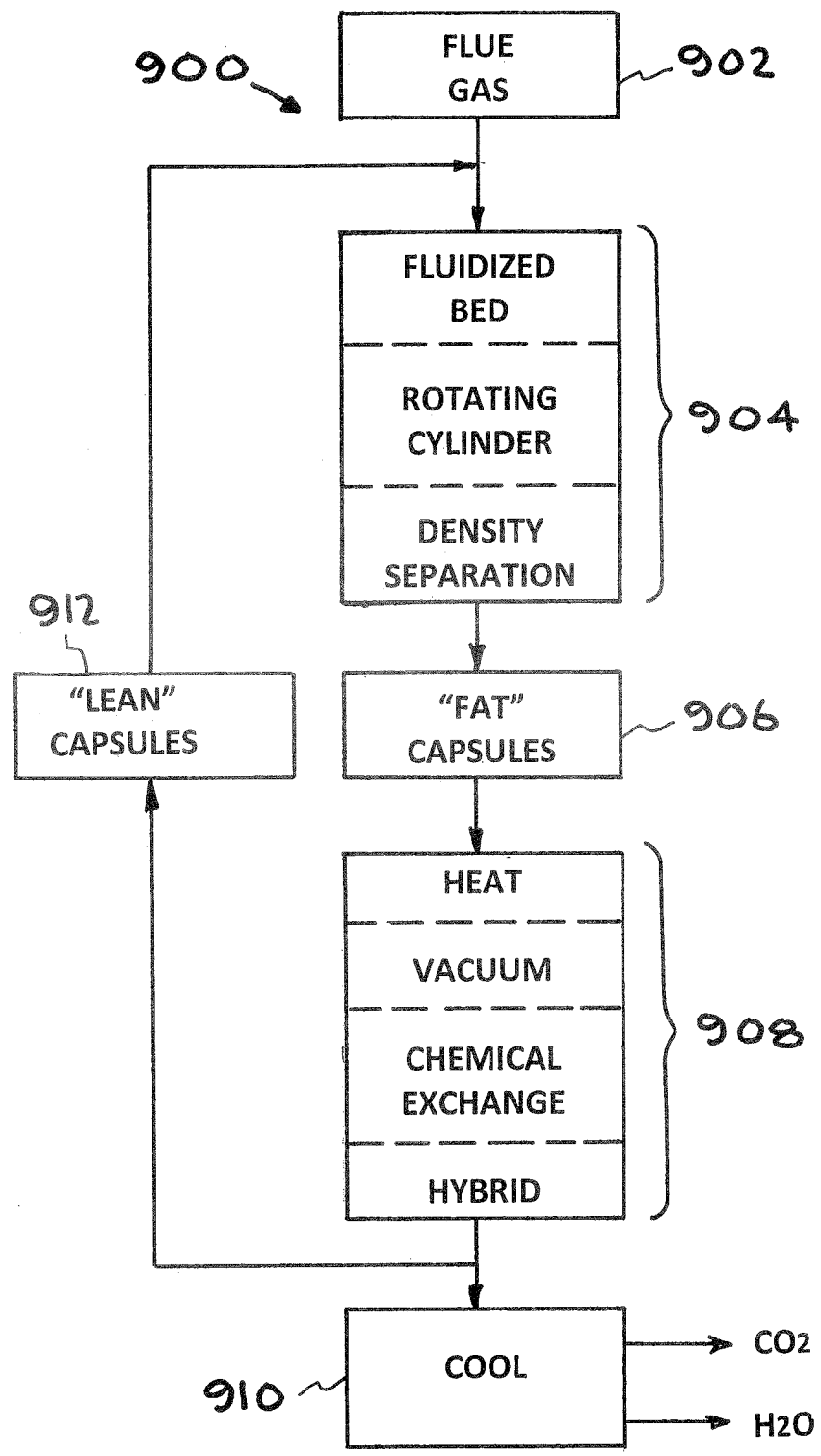
FIG. 9 illustrates flue gas (e.g., $CO_2$, $H_2O$, $N_2$, $SO_x$, $NO_x$) and/or other gas mixtures being processed by passing it upwards through a absorption tower while being contacted with a suspension of polymer coated capsules.

In example 5, a system for carbon dioxide removal from gas mixtures is described and illustrated. Example 5 is illustrated by FIG. 9 showing a method of separating $CO_2$. The method is designated generally by the reference numeral 900. The steps of the method 900 are described below.

Method Steps—FIG. 9

Step 1 (Reference Numeral 900)—Flue gas (e.g., $CO_2$, $H_2O$, $N_2$, $SO_x$, $NO_x$) and/or other gas mixtures is processed by passing it upwards through a absorption tower while being contacted with a suspension of polymer coated capsules. The capsules will have a diameter and density such that they are sufficiently buoyant in the upward flowing gas stream that they behave as a fluidized bed. The system is operated such that a suitable contact time is achieved for gas reactions to take place and $CO_2$ separated from the gas mixture. During contact with the gas mixture, the capsules will over time become enriched in $CO_2$ because the solvent contained within the capsule has a strong affinity for $CO_2$. Some or most of the $CO_2$ originally in the gas mixture is now contained within the capsules.

The solvent may be an amine, an inorganic base, or any other solvent which has a high capacity for take-up of $CO_2$. Preferential partitioning of $CO_2$ into the capsule is due to the relatively higher solubility of $CO_2$ in the encapsulated solvent vs. other components of the mixed gas stream such as nitrogen or oxygen. The capsules remain in the gas stream until they contain sufficient CO, such that they are ready for removal from the gas contactor for transport to the regenerator where the contained CO, will be removed.

In one embodiment, the capsules remain in the system for some period of time before they are entirely removed from the system. As such the system is operated in a batch mode.

In another embodiment, the capsules are fed and removed continuously at a rate such that the mean residence time allows for sufficient CO, recovery to meet requirements. In this case, not all the capsules will be fully loaded but the average loading is sufficient to provide for the desired flux of $CO_2$ removal. As such the system operates in a continuous mode.

In another embodiment, the capsule solvent is chosen and designed such that as the capsules load with CO, they become progressively more dense than unloaded capsules and as a consequence the loaded capsules self-separate and drop to the bottom of the tower where they are removed for transport to the regenerator described in Step 2. As such the system operates in a continuous mode.

In another embodiment, the capsules contact the mixed gas stream in a rotating tipped cylinder such that the capsules form a bed residing on the lower surface of the rotating cylinder and cascade down the length of the cylinder, while the gas stream passes upwards through the cylinder contacting the cascading capsules. At the bottom, the capsules are removed and cycled back to the top for additional loading. In this embodiment, the system may be operated either in batch or continuous mode. The advantage for this contact method is that the capsules no longer must be sufficiently buoyant such that they form a fluidized bed in the gas tower, as is the case for the other contact scenarios.

The solvent contained within the capsule is chosen such that is has a preferentially high solubility of $CO_2$ and low solubility of other gas stream components such as nitrogen and oxygen. Solvents that are alkaline have this property because the $CO_2$ will ionize in them to form bicarbonate ($HCO_3-$) and carbonate ($CO_3-$) species which are highly soluble in aqueous solutions and in aqueous solutions of amines. The solvent of choice may be an amine such as methylethanolamine (MEA) or other amine-based solvents that have high solubilities for $CO_2$. The solvent may be an inorganic solution of a base, such as sodium hydroxide, potassium carbonate, sodium borate, or sodium phosphate or any of many other inorganic solvents that are bases in the sense of acid-base reactions, and have high solubilities of carbon dioxide. It is the solvent that provides selectivity for $CO_2$. The capsule wall will be permeable to all of the gas components including water, and does not provide selectivity for $CO_2$.

Step 2 (Reference Numeral 900)—The loaded "fat" capsules from Step 1 are now ready for $CO_2$ extraction "regeneration" in order to produce a concentrated $CO_2$ stream. The goal is to produce a relatively pure stream of $CO_2$ such that it can be compressed to a liquid form for transport or storage. As such the derived $CO_2$ stream must not contain appreciable amounts of non-condensable gases such as nitrogen, oxygen or argon.

Regeneration to remove the contained $CO_2$ is carried out by heating the capsules to an elevated temperature where the equilibrium content of $CO_2$ is much lower than the equilibrium content of $CO_2$ during collection from the mixed gas stream. The temperature may be around 100 C or may be a much higher temperature. The optimal temperature of regeneration depends on the type of solvent contained within the capsule and the $CO_2$ loading.

The capsules may be regenerated by contacting them with hot steam, which will produce a gas containing mainly $CO_2$ and $H_2O$, and which upon cooling will self-separate into a dominantly $CO_2$ gas phases and liquid water (Step 3).

The capsules may be regenerated by heating in pressurized liquid water which will upon lowering of the containing pressure will produce a stream of relatively pure $CO_2$.

During heating, $CO_2$ and water escape from the capsule into the surrounding gas phase. The solvent is chosen such that it is not volatile at the temperature of regeneration and therefore does not preferentially leave the capsule with $CO_2$ and water, although small amounts may leave the capsule for some solvents and can be tolerated for some applications. In addition, for sparingly volatile solvents such as amines, the capsule shell reduces the flux of the solvent out of the capsule. This allows the working temperature of regeneration for the encapsulated solvent to be higher than is possible for systems where the amine solvent is not encapsulated. Regeneration at a higher relative temperature produces a higher partial pressure of $CO_2$ which lowers the energy needed for compression and liquification of $CO_2$ which may lowers the overall cost of $CO_2$ collection.

Another advantage of encapsulation of amine solvents is that the liquid amine does not directly contact materials used in the regenerator, such as metals, which reduces corrosion and allows potentially less expensive construction materials. For example, carbon steel can be used to replace stainless steel. A related benefit is that if thermal degradation of the solvent takes place, the degradation products tend to remain within the capsules and do not contact the containment housing and in so doing cause damage due to corrosion or scaling.

Step 3 (Reference Numeral 900)—The regenerated capsules that have been thermally treated are now have low $CO_2$ contents ("lean") and are suitable for another cycle of $CO_2$ capture. The capsules may be removed from the gas or liquid water using a mechanical filter of any of a variety of type and designs. The separated capsules are then returned to Step 1 to begin another cycle.

Separation of the $CO_2$ from water takes place by cooling the hot gas to produce liquid water and a separate $CO_2$ gas phase. It is advantageous in this step and in the overall process to make use of heat exchangers to capture heat from the condensation of steam, if it is generated, and use it to heat the incoming "fat" stream of encapsulated $CO_2$.

The carbon dioxide that has been separated from the gas mixture can be sold, stored, sequestered, or otherwise disposed of.

EXAMPLE 6

In example 6, a system for nitrous oxide removal from gas mixtures is described. Capsules having a polymer coating and stripping solvents encapsulated in the capsules are provided. The polymer coating is permeable to nitrous oxide. The polymer coated capsules are exposed to the gas mixture that includes nitrous oxide. The nitrous oxide migrates through the polymer coating of the capsules and is taken up by the stripping solvents. The nitrous oxide is separated from the gas mixture by driving off the nitrous oxide from the polymer coated capsules. This may be accomplished, for instance, by heating the polymer coated capsules. For example, steam can be directed onto the polymer coated capsules to drive off the nitrous oxide from the capsules. The nitrous oxide that has been separated from the gas mixture can be disposed of.

EXAMPLE 7

In example 7, a system for hydrogen sulfide removal from gas mixtures is described. Capsules having a polymer coating and stripping solvents encapsulated in the capsules are provided. The polymer coating is permeable to hydrogen sulfide. The polymer coated capsules are exposed to the gas mixture that includes hydrogen sulfide. The hydrogen sulfide migrates through the polymer coating of the capsules and is taken up by the stripping solvents. The hydrogen sulfide is separated from the gas mixture by driving off the hydrogen sulfide from the polymer coated capsules. This may be accomplished, for instance, by heating the polymer coated capsules. For example, steam can be directed onto the polymer coated capsules to drive off the hydrogen sulfide from the capsules. The hydrogen sulfide that has been separated from the gas mixture can be disposed of.

EXAMPLE 8

In example 8, a system for sulphates removal from gas mixtures is described. Capsules having a polymer coating and stripping solvents encapsulated in the capsules are provided. The polymer coating is permeable to sulphates. The polymer coated capsules are exposed to the gas mixture that includes sulphates. The sulphates migrates through the polymer coating of the capsules and is taken up by the stripping solvents. The sulphates is separated from the gas mixture by driving off the sulphates from the polymer coated capsules. This may be accomplished, for instance, by heating the polymer coated capsules. For example, steam can be directed onto the polymer coated capsules to drive off the sulphates from the capsules. The sulphates that has been separated from the gas mixture can be disposed of.

Capsule Making System

Figure 7:
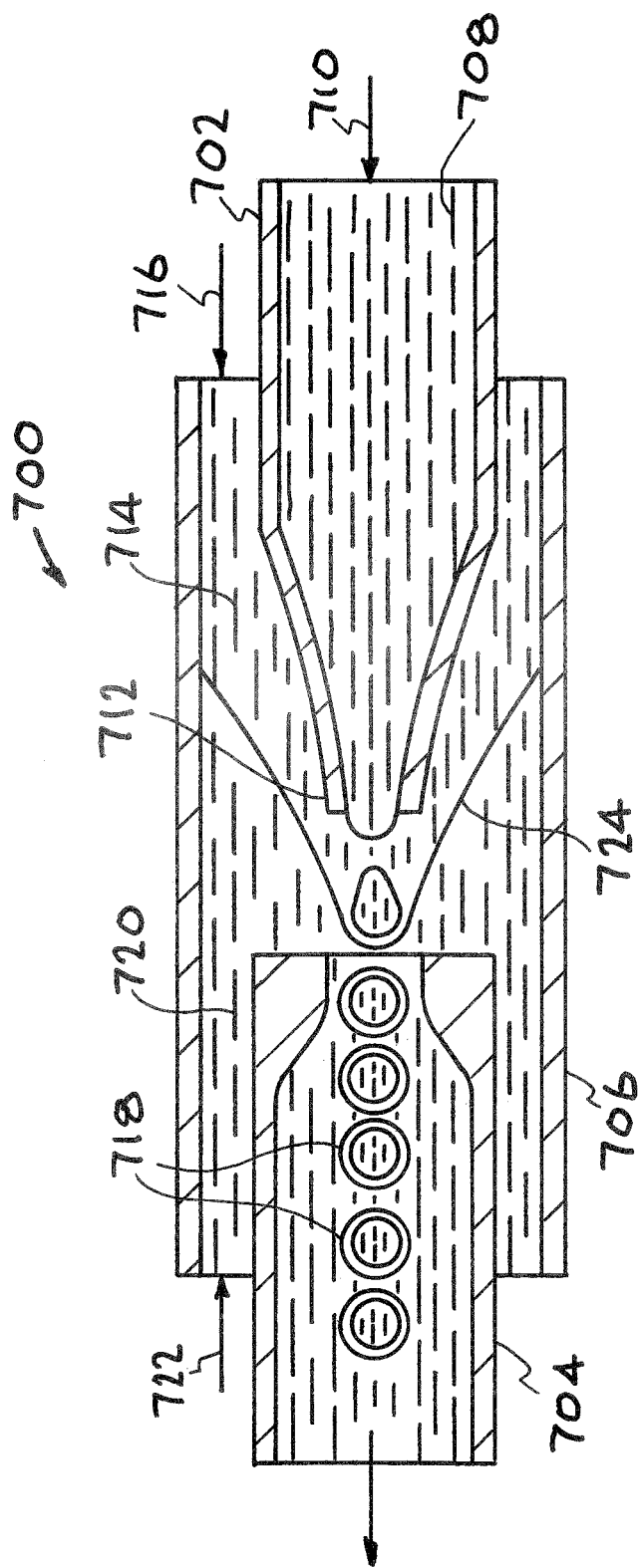
FIG. 7 illustrates a system for making polymer coated capsules.

FIG. 7 illustrates a system for making polymer coated capsules. FIG. 7 illustrates a system and method of fabricating double-emulsion microcapsules. The schematically illustrated method 700 will be composed of the following items. The injection tube 702 with a ID (um) and OD 1000 (um), a collection tube 704 with an ID of 500 (um) and OD 1000 (um) and an outer tube 706 of square cross section with ID of 1000 (um) and ID of 1200 (um).

In operation the inner fluid 708 (MEA/$H_2O$) with a viscosity of 10-50 (cP) and a flow rate of 200-800 (Ulh-1) flows in the injection tube 702 in the direction indicated by arrow 710. As this fluid proceeds it passes thru a droplet forming nozzle 712. The formed droplet is released from the nozzle and becomes encased in the middle fluid 714 (NOA Pre-polymer) with a viscosity of 10-50 (cP) and flow rate of 200-800 (uLh-1), the middle fluid 714 is flowing in the direction indicated by arrow 716. The inner fluid droplet 708 becomes encased in the middle fluid 714 forming an encapsulated microcapsules 718 that have a $CO_2$ capturing solvent core with a thin $CO_2$ permeable outer shell. The outer fluid (PVA Stabilizer) with a viscosity of 10-50 (cP) and a flow rate of 200-800 (uLh-1) flowing in the outer tube 706 in the direction indicated by arrow 722. This outer fluid 720 carries the fabricated microcapsules 718 into the collection tube 704. There is a boundary layer 724 that prevents the middle fluid 714 and outer fluid 720 from mixing as they have a large difference in both their viscosity and flow rates. The above described method will produce Microcapsules of a controlled size with an inner fluid (solvent/catalyst) enclosed in a $CO_2$ permeable polymer shell.

Systems for producing microcapsules are described in U.S. Pat. No. 7,776,927 and in U.S. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No.

2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloidosome. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

Mass Transfer

Encapsulated solvents can be used to capture carbon dioxide from power plant flue gas. The limiting step in mass transfer is probably diffusion across the polymer membrane. The mass transfer rate is then proportional to the permeability of the membrane. Permeability has a wide range of values for different polymers. A permeability for $CO_2$ of 100 barrer is chosen as a benchmark because it is higher than most polymers but can be achieved with several different chemistries. At 100 barrer permeability, 200 μm diameter, and 5 μm wall thickness, encapsulated solvents have about 2 orders of magnitude slower absorption per unit surface area than conventional liquid solvents.

A bed of spherical beads is explored as a system design. With 200 μm diameter beads and close spherical packing, such a bed has 2 orders of magnitude higher surface area per unit absorber volume than a conventional packed tower using a liquid solvent. High pressure drop appears to be the primary drawback of this configuration, which is estimated to be orders of magnitude larger than for a conventional packed tower. The high pressure drop is largely due to the low proportion of void space in tight-packed spheres (36%-40%, compared with 90-97% in commercial tower packings).

A system based on a packed bed of beads will be viable if a higher permeability can be achieved (on the order of 1000 barrer), or if more void space can be introduced to the system (e.g. a doubling). In principle, resistance to mass transfer of $CO_2$ into (or out of) the bead can occur in three zones: (1) from the bulkgas to the surface of the polymer shell (gas-phase resistance), (2) through the polymer shell (membrane resistance), and (3) from the inner surface of the shell to the bulk of the inner fluid (liquid-phase resistance). For this calculation, Applicants assume that membrane resistance is overwhelmingly the slowest step and therefore controls mass transfer. In this case the flux across the membrane, J, is given by:

$$J = \frac{\text{mass transfer rate}}{\text{surface area of membrane}} = \frac{P\Delta p}{L}\left[\frac{\text{mol}}{\text{m}^2\text{s}}\right] \qquad \text{[Equation 1]}$$

where $\Delta p$ is the pressure drop across the membrane, L is the thickness of the membrane, and P is the permeability coefficient of the polymer. For our purposes, the $CO_2$ pressure on the outside of the shell is the gas-phase partial pressure in the flue gas. Since Applicants assume the inner fluid is a fast solvent, the effective $CO_2$ pressure on the inner wall of the shell is the equilibrium partial pressure of $CO_2$ above the solvent at the appropriate temperature and carbon loading. This is generally small compared to the partial pressure in the flue gas. For example, flue gas typically starts at 15% $CO_2$=0.15 atm=15200 Pa. The equilibrium partial pressure of CO, for 5M Monoethanolamine (MEA) at 40° C. and 0.3 mol $CO_2$/mol amine is 22 Pa. So for our purposes, $\Delta p$ is equal to the partial pressure of $CO_2$ in the flue gas.

The permeability coefficient depends slightly on temperature and pressure, but is mostly a function of the polymer(s) comprising the membrane. It ranges at least four orders of magnitude. The literature on gas separation with membranes makes much of the trade-off between permeability and "selectivity", that is, the relative permeabilities of $CO_2$ and $N_2$. Higher permeabilities are usually achieved with lower selectivity, and vice versa. However, Applicants achieve selectivity through the solvent, which reacts with $CO_2$ and not with $N_2$, which may drive us toward the most permeable polymer that meets structural requirements. Alternatively, Applicants may be limited by relative selectivity of the membrane for $CO_2$ over solvent.

The synthetic polymer with the largest measured permeabilities is poly(1-trimethylsilylpropyne). This polymer possesses a carbon dioxide permeability of 28,000 barrer and a nitrogen permeability of 4970 barrer. These very large permeabilities are associated with a very large fractional free volume. These permeabilities tend to decrease with time due to slow crystallization of the polymer. This effect can be counteracted by the addition of certain additives.

However, for now Applicants will set aside the possibility of a membrane with very high fractional free volume and consider the more typical polymers. Without knowing the constraints on polymer choice for the encapsulation, Applicants choose 100 barrer as the base case permeability because it appears to be achievable with a variety of different chemistries (polyimides, polyacetylenes, polycarbonates). Applicants will keep in mind that this may be a conservative choice. For perspective, Applicants can compare a permeability of 100 barrer to some representative mass transfer coefficients in $CO_2$ capture systems. Equation 1 is analogous to the classic mass transfer equation across an interfacial boundary:

$$J = K\Delta C$$

where K is the overall mass transfer coefficient and $\Delta C$ is the concentration difference between, in our case, the bulk flue gas and the equilibrium partial pressure of $CO_2$ above the solvent. If Applicants cajole P and $\Delta p$ into units of concentration (assuming STP), then Applicants have P/L ↔ K in units of length per time. In these units, both coefficients are what physicists might call the "piston velocity". That is, if there were a piston above the interface, moving steadily at the piston velocity and pushing flue gas across the boundary, you would get an equivalent mass transfer rate of $CO_2$. Although there are numerous caveats in comparing these numbers (one being that P is measured empirically using a single gas and a physical pressure drop and the membranes may respond differently to an equivalent concentration gradient), Applicants think it is a safe conclusion that, under our assumptions, mass transfer across the membrane is about 2 orders of magnitude slower than across the interface of a liquid solvent.

However, the mass transfer rate is proportional to surface area, and encapsulation has the potential to provide a lot of surface area compared to standard liquid-gas system. Consider a bed of randomly-packed spherical beads of equal diameter, d and packing density_(volume of beads/bulk volume). The surface area per bulk volume of absorber is:

$$\frac{S}{V} = \frac{\pi d^2}{\frac{1}{6}\pi d^3/\rho} = \frac{6\rho}{d} \quad \text{[Equation 2]}$$

For close random packing of spheres, typical values of_range from 0.60 to 0.64. For comparison, packings for gas/liquid absorbers have solid surface area in the range of 100-1000 m2/m3. The effective interfacial area is usually less, because not all surfaces get wet and some pools stagnate and saturate. Typical values for an MEA system would be 250 m2/m3 for the packing and about 80% area utilization. Thus, Applicants have about two orders of magnitude more surface area in a bed of packed beads than in a typical liquid absorber. So, even with our two orders of magnitude slower mass transfer, the mass transfer performance of the beads is equal to a packed tower. Higher permeabilities, as have been obtained with semicosil, improve the performance.

As a benchmark, Applicants may consider the minimum time it takes for a bead filled with MEA to reach saturation. Building from Equation 1, the loading time, $\tau$, for a bead to reach the liquid saturation concentration of $CO_2$, Csat, is given by:

$$\tau = \frac{(\text{volume of bead}) \cdot C_{sat}}{(\text{surface area of bead}) \cdot (\text{flux})} = \frac{\frac{1}{6}\pi d^3 C_{sat}}{\pi d^2 P \Delta p/L} = \frac{C_{sat} L d}{6P\Delta p}$$

The theoretical Csat for MEA is 0.5 mol $CO_2$/mol MEA, which for a 30 wt % MEA solution comes to about 10 wt % $CO_2$ or 2.4 M. as a function of bead diameter and wall thickness. This appears to be due to different assumptions about permeability.

Two important parameters for a capture system are gas flow rate and absorber height. The two together determine the capture effectiveness from flue gas $\epsilon=(1-CO_2 \text{ out}/CO_2 \text{ in})$. And while slowing the gas low rate increases effectiveness (by increasing the residence time of the gas), it also decreases capital utilization. For example, at half the gas flow rate one needs twice as many absorber towers (or one tower with twice the cross-section) for the same throughput. Absorber height and gas flow rate both also determine the pressure drop across the absorber which in turn contributes to energy use. Thus, a meaningful selection of gas flow rate and absorber height cannot be made without considering capital cost against the cost of energy. However, Applicants can make some rough assumptions to see if Applicants are in a tenable design space.

Suppose again that Applicants have a bed of randomly-packed beads of diameter d and packing density p. If the mass transfer rate follows Equation 1 then mass transfer is first order with the $CO_2$ concentration in the flue gas. As a parcel of gas moves through the absorber, the $CO_2$ concentration then follows first order decay:

$$C(t) = C_{in} e^{-K_{gas} t}$$

where C(t) is the concentration of $CO_2$ in the gas parcel at time t and Kgas is the rate constant of $CO_2$ loss with units of inverse time. Applicants can also think of Kgas as the mass transfer rate in the parcel per unit concentration:

$$K_{gas} = \frac{Q}{V_{gas}} \cdot \frac{1}{C(t)}$$

Combining Equations 1 and 2 Applicants have the mass transfer rate per unit volume of absorber: And the volume of gas per unit volume absorber is:

$$\frac{V_{gas}}{V} = (1-\rho)$$

Applicants are almost ready to combine the above three equations to find Kgas but Applicants have a slight snag in that P is defined to include units of inverse pressure instead of inverse concentration. As in Table 1, Applicants will cajole P to include units of inverse concentration by assuming STP. Applicants can then replace $\Delta p$ by C and get:

$$K_{gas} = \frac{Q}{V_{gas}} \cdot \frac{1}{C(t)} = \frac{6PC(t)\rho V}{dL(1-\rho)V} \cdot \frac{1}{C(t)} = \frac{6P\rho}{dL(1-\rho)}$$

Applicants can now calculate the residence time of flue gas, $\tau_{gas}$, required for a particular capture effectiveness, e:

$$\frac{C(t=\tau_{gas})}{C_{in}} = 1 - e = e^{-K_{gas}\tau_{gas}} \Longrightarrow \tau_{gas} = -\frac{\ln(1-e)}{K_{gas}}$$

For $CO_2$ capture from power plants, Applicants typically assume the capture system must be at least 90% effective. For our base case of P=100 barrer, wall thickness=5 μm, and d=100 μm, Applicants calculate a residence time of 1.6 s. Again, the flow rate of gas in the tower is a tunable parameter, but for a sense of scale Applicants can consider that the superficial velocity in a large-scale packed tower is typically on the order of 1 m/s. That would put the absorber height in our base case at about 4 m. This is comfortably inside the realm of industrial practice for a packed tower. However, the types of packings used in those towers have much more void space—90-97% in the physical packing, compared with our 38%.

The pressure drop across a bed of packed spheres is a well-studied problem. It can be estimated from the semiempirical Ergun Equation, which derives from an energy balance on kinetic energy and frictional losses:

$$\frac{\Delta P_{bed}}{H} = 150 \cdot \frac{\rho^2 \mu V_s}{\Phi^2(1-\rho)^3 d^2} + 1.75 \cdot \frac{\rho \cdot \rho_{gas} V_s^2}{(1-\rho)^3 \Phi d} \quad \text{[Equation 3]}$$

where:

$\Delta P$ is the pressure drop across the bed [Pa]

H is the height of the bed [m]

p is still the bulk packing density of beads, assumed 0.62

μ is the dynamic viscosity of the fluid, assumed 2.0×10−5 kg/(m·s) (the dynamic viscosity of air at 40° C.)

In the previous sections on packed towers, Applicants found that the tower height required for a given capture effectiveness is proportional to the superficial gas velocity, Vs:

$$H = \frac{V_s \cdot \tau_{gas}}{(1-\rho)}$$

However, the cross-sectional area of the tower required for a given flow of flue gas is inversely proportional to the velocity:

$$\text{Area} = \frac{\text{Flowrate}}{V_s}$$

Which means that the packing volume (H×Area) is actually constant with Vs. Applicants also know that the pressure drop falls strongly with Vs. Therefore, if one had a very wide, very short tower, one may be able to overcome the pressure drop concerns of a conventional packed tower without necessarily needing more beads. In a conventional configuration, this would be impractical, because space and capital required for flow distributors would be overwhelming and edge effects would diminish mass transfer efficiency. But perhaps these problems can be overcome by turning the tower on its side, if you will.

Grain drying systems, which contact massive amounts of granular solids with hot air, offer a good analogy for encapsulated solvents. There are many types of systems for grain and similar drying applications, including fluidized beds, rotating trays, and many which look much like a typical packed bed. A type of continuous flow drying system, as shown in FIGS. 6A and 6B, can be use. In this type of system, solids are held between vertical and slanted perforated walls while gas is blown perpendicular to the walls. Wet solids are added to the top of the walls while dry solids are removed slowly from the bottom by paddle-wheel type "metering rolls". The advantages of this configuration are (1) the large effective cross-sectional area achieved by flowing the gas horizontally and stacking the solids vertically, (2) the low gas velocity required in turn, and (3) the independent rate of solids circulation, allowing continuous flow operation. Differences between grain drying and carbon capture with encapsulated amines include particle sizes (grains tend to be mm scale or larger), particle strength and flow characteristics, and potentially different regimes of residence time and pressure drop. In particular, the walls of the absorber must contain much smaller particles and probably withstand a higher pressure drop than the walls of an analogous grain dryer.

Applicants can model the walls of moving-bed system as a perforated plate through which the flue gas must flow. The holes should allow gas to pass through but retain the beads without impeding their movement. Applicants assume the plate is made from solid steel or similar alloy, as opposed to a wire mesh or fabric. These latter options would yield a lower pressure drop and probably lower capital expense, but could not hold against much total pressure and might abrade the beads. The conclusion of this section is that the pressure drop across an appropriate plate is generally less than 1 kPa—small compared to the likely pressure drop across the beads themselves. However, the strength of the plates, and the ease of fabricating relatively small holes in thick plates, may be nontrivial considerations.

Empirical correlations for pressure drop across a perforated plate which depend only on open area and air velocity are widely available. However, these are based on plates with much larger holes than Applicants require, which allows the friction of flow inside the hole, and thus the thickness of the plate, to be neglected.

In general, the pressure drop across a perforated plate, $\Delta P_{plate}$ consists of losses from compression of the gas into the holes, friction through the holes, and then expansion on the other side. The following expression can be used for calculating the pressure drop across a dry, perforated plate. The terms within the brackets address those three kinds of losses, respectively:

$$\Delta P_{plate} = k\left[0.4\left(1.25 - \frac{A_h}{A_c}\right) + 4f(T/d_h) + \left(1 - \frac{A_h}{A_c}\right)^2\right]\frac{V_h^2 \rho_{gas}}{2}$$

where:

- $\frac{A_h}{A_c}$ is the ratio of hole area to total plate area []
- $T$ is the thickness of the plate [m]
- $d_h$ is the diameter of the holes [m]
- $V_h$ is the velocity of gas inside the hole [m/s], which is related to the superficial velocity by: $V_h = \frac{V_s}{A_h/A_c}$
- $f$ is the Fanning friction factor, discussed below []
- $k$ is an empirical correction, given by *McAllister et al.* as a complicated function of $T/d_k$.

It ranges from about 0.85 to 1.9[].

The Fanning friction factor (equal to one fourth of the Darcy friction factor) is a function of the Reynolds number of the system, Re, which for flow through smooth, circular pipes, and correcting the superficial velocity to the velocity inside the holes, is defined by:

$$Re = \frac{\rho_{gas} V_s d_h}{\mu(A_h/A_c)}$$

In our reasonable parameter space, Re ranges from 0.32 to 32, which is solidly in the laminar flow regime (for flow in a pipe, Re<2300 is generally laminar). In the laminar regime, Applicants can calculate the Fanning friction factor by:

$$f = \frac{16}{Re}$$

Now Applicants have to make some assumptions about the hole size and thickness of the plates. It seems fairly obvious that the holes should be smaller than the beads (dh<d), but not much smaller. Applicants will assume dh=75 μm for the base case. The required thickness of the plate is a structural engineering question that can't really be answered without a detailed system design. However, the wall thickness of steel pressure vessels may offer some guidance. From the previous discussion on packed beds, Applicants may expect pressure drops across the bed on the order of 100 kPa. For a large (diameter=2 m), cylindrical vessel of typical steel at that pressure, the required wall thickness is 1.2 mm. One can play with the assumptions about curvature, pressure, and steel strength and get +/−a factor of 3 or so. Now, for our hole size, 1.2 mm actually gives a T/dh ratio a factor of 2 outside the range of McAllister et al.'s data, and thus Applicants don't know quite what to use for k (assume k=2) because at the end of the range, k=1.5 and is trending up. It also may be challenging from a fabrication perspective. Applicants haven't seen many applications using holes that small, let alone with such thick plates. On the other hand, the structural design space is so open that thicker plates should be usable.

The last parameter to consider is the fraction of open area, Ah/Ac. Perforated metals are commonly available with open area up 60% (IPA, 1993), however, that comes at the price of reduced strength. At 20% open area, strength is reduced by about 50%; at 60% open area, strength is reduced to 15-20% of solid-plate strength. Applicants have assumed 20% open area.

The most important thing to note from these results is probably that the y-axis is in Pa instead of kPa; these pressure drops are small compared to the pressure drop across a bed of beads.

Applicants will assume a capture effectiveness of $CO_2$ from flue gas of 90%. With the height fixed, the gas velocity, Vs, is adjusted to achieve 90% capture. The pressure drop can then be calculated. Much of this parameter space seems to fall under the rough upper bound Applicants proposed for pressure drop of 140 kPa, which is encouraging. An interesting feature of the moving-bed configuration is that the pressure drop is higher for higher-permeability beads, because the gas is being pushed though faster. The trade-off is capital cost: the higher the permeability, the less wall area is required for a given size power plant.

Now let's put the pieces together in an example. Suppose Applicants have 200 μm beads with 400 barrer permeability. The superficial velocity required to achieve 90% capture is 0.18 m/s. At this rate, Applicants need 49 commercial grain dryer-sized units to handle a 430 MWe coal plant. Each operates with a pressure drop of 34.7 kPa across the bed and 0.25 kPa across the inner and outer walls (assuming 1.2 mm wall thickness). In energy terms, Applicants expect that this pressure drop is entirely manageable. Notably, the force due to the pressure drop must be resisted physically by the outer wall and by the beads, especially those closest to the outer wall, 35 kN/m2 is a substantial force, equivalent to being at the bottom of about 12 ft of water column. The left side of the beads on the left side of the diagram are being pressed against the outer wall with that force, which translates to about 2 mN per bead. Nanoidentor compression tests are analogous to this situation. Applicants have not conclusively tested our own beads yet, but estimates based on the literature and polymer properties indicate that they will be able to withstand tens of mN of force before rupturing. Supposing this is correct and the beads are not at risk of rupturing, they still may substantially deform, which in turn would decrease void space and increase pressure drop. And so investigation of the deformation properties of the beads appears to be in order. Another concern is that the pressure would pin the beads in place, impeding flow which in grain drying systems occurs by gravity. The leftward pressure on the leftmost beads overwhelms gravity by a factor of 4×105 which seems to preclude any gravitational settling of the beads. Applicants could overcome this by giving the gas flow a downward component, for example by having more holes toward the bottom of the outer wall.

Catalysis and Choice of Working Solvent

The working model is that $CO_2$ physically diffuses through the polymer shell and then reacts in the inner fluid to form carbonates or complexes. This approach implies that a catalyst, if used, should be dissolved in the inner fluid or anchored to the inner surface of the shell. The catalyst is only helpful in this case if reaction in the solvent would otherwise slow mass transfer. In the previous calculations Applicants assumed that reaction in the solvent did not significantly slow the reaction, either by use of a fast solvent or by enhancing the reaction with a catalyst.

Mass transfer through a series of media can be described by the electrical resistance model, where the resistance, R, is the inverse of the mass transfer coefficient, K. If Applicants neglect gas-side resistance (which is probably a good assumption), then Applicants have:

$$R_{total} = R_{shell} + R_{solvent}$$
$$\Rightarrow \frac{1}{K_{total}} = \frac{1}{K_{shell}} + \frac{1}{K_{solvent}}$$

If one mass transfer coefficient is much smaller than the other, it will tend to dominate the total and the larger one can be neglected. In a bead filled with one of these solvents, the "equivalent permeability" is the permeability for which the shell and solvent are contributing equally to mass transfer resistance. For example, for a bead with 5 μm wall thickness filled with 0.33 M NaOH, the equivalent shell permeability is 10,000 barrer. If Applicants had a shell with 1,000 barrer permeability, then the solvent would be contributing only 9% of the total resistance, which is to say, addition of a catalyst could speed the rate of mass transfer by, at most, 9%. If Applicants had a shell with permeability of 10,000, then a catalyst could speed the rate of mass transfer by, at most, 50%.

Note that K depends on a number of factors, such as turbulence in the measurement system, temperature, and precise composition of the solution, so these values should be taken as order-of-magnitude guides only. However, considering that the highest measured permeability for a polymer membrane is 28,000 barrer, it seems apparent that a catalyst would not be very helpful in beads filled with a fast-reacting solvent like MEA. However, the catalyst should be helpful for a slower solvent like sodium bicarbonate, paired with a membrane with permeability of a few hundred barrer or higher.

Those conclusions still assume that the catalyst is dissolved in the inner fluid or anchored to the inner surface of the shell. An alternative approach would be to embed catalyst in the polymer shell or on the outer surface of the shell. This approach implies that $CO_2$ is hydrolyzed on the outer surface or somewhere inside the shell material and then diffuses to the inner fluid as carbonate. In this case, Applicants can model the shell as an immobilized liquid membrane. The shell material has micro- or nano-pores where the solvent is held by capillary pressure. $CO_2$ diffuses from the outside of the capsule to the bulk fluid on the inside through the pore liquid. Mass transfer into the beads is controlled by diffusion and reaction of species in the pore channel, including $CO_2$ (aq), $HCO^-_3$, and protonated and unprotonated buffer. The catalyst must be present in the pore channel to be effective.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of separating carbon dioxide from flue gas containing the carbon dioxide, comprising the steps of:
   mixing the flue gas with water thereby dissolving the carbon dioxide in said water and producing water with the carbon dioxide;
   producing capsules having an exterior polymer coating wherein said exterior polymer coating includes carbon fibers oriented along said exterior by directing an inner fluid containing stripping solvents through an injection tube with a droplet forming nozzle into a middle fluid of said polymer coating and said carbon fibers wherein formed droplets containing said stripping solvents are released from said nozzle and are encased in said middle fluid of said polymer coating and said carbon fibers producing said capsules and stripping solvents encapsulated in said capsules, that are carried by an outer fluid in a collection tube, wherein said polymer coating and said carbon fibers oriented along said exterior are permeable to carbon dioxide;
   exposing said capsules having a polymer coating and said carbon fibers oriented along said exterior and stripping solvents encapsulated in said capsules to said water with the carbon dioxide, wherein the carbon dioxide migrates through said polymer coating and said carbon fibers oriented along said exterior and is taken up by said stripping solvents providing capsules with the carbon dioxide; and
   separating the carbon dioxide from said capsules with the carbon dioxide by driving off the carbon dioxide from said capsules by heating said capsules with the carbon dioxide.

2. The method of separating carbon dioxide from flue gas containing the carbon dioxide of claim 1 wherein said stripping solvents are primary, secondary, tertiary, and hindered amines, caustic solutions, ionic buffer solutions, ammonia, or other solvents having solubility of carbon dioxide.

3. The method of separating carbon dioxide from flue gas containing the carbon dioxide of claim 1 wherein said stripping solvents are amines.

4. The method of separating carbon dioxide from flue gas containing the carbon dioxide of claim 1 wherein said exterior polymer coating is made of any of several families of polymers including polystyrene, polyethylene, polypropylene, and nylon wherein said exterior polymer coating includes carbon fibers oriented along said exterior.

5. A method of separating carbon dioxide from flue gas containing the carbon dioxide, comprising the steps of:
   mixing the flue gas with water thereby dissolving the carbon dioxide in said water and producing with the carbon dioxide;
   producing capsules having a polymer coating wherein said polymer coating includes carbon fibers by directing an inner fluid containing stripping solvents through an injection tube with a droplet forming nozzle into a middle fluid of said polymer coating and said carbon fibers wherein formed droplets containing said stripping solvents are released from said nozzle and are encased in said middle fluid of said polymer coating and said carbon fibers producing said capsules that are carried by an outer fluid in a collection tube, wherein said polymer coating and said carbon fibers are permeable to carbon dioxide;
   exposing said capsules having stripping solvents encapsulated in said polymer coating and said carbon fibers to said water with the carbon dioxide, wherein the carbon dioxide migrates through said polymer coating and said carbon fibers and is taken up by said stripping solvents providing capsules with the carbon dioxide; and
   separating the carbon dioxide from said capsules with the carbon dioxide by driving off the carbon dioxide from said capsules by heating said capsules with the carbon dioxide.

6. A method of separating carbon dioxide from flue gas containing the carbon dioxide, comprising the steps of:
   mixing the flue gas with water thereby dissolving carbon dioxide in said water and producing water with the carbon dioxide;
   producing capsules having a polymer coating wherein said polymer coating includes carbon nanotubes by directing an inner fluid containing stripping solvents through an injection tube with a droplet forming nozzle into a middle fluid of said polymer coating and said carbon nanotubes wherein formed droplets containing said stripping solvents are released from said nozzle and are encased in said middle fluid of said polymer coating and said carbon nanotubes producing said capsules that are carried by an outer fluid in a collection tube, wherein said polymer coating and said carbon nanotubes are permeable to carbon dioxide;
   exposing said capsules having stripping solvents encapsulated in said polymer coating and said carbon nanotubes to said water with the carbon dioxide, wherein the carbon dioxide migrates through said polymer coating and said carbon nanotubes and is taken up by said stripping solvents providing capsules with the carbon dioxide; and
   separating the carbon dioxide from said capsules with the carbon dioxide by driving off the carbon dioxide from said capsules by heating said capsules with the carbon dioxide.

* * * * *